(12) United States Patent
Qiao et al.

(10) Patent No.: US 9,932,867 B2
(45) Date of Patent: *Apr. 3, 2018

(54) IRON-BASED ALLOYS AND METHODS OF MAKING AND USE THEREOF

(71) Applicant: L. E. Jones Company, Menominee, MI (US)

(72) Inventors: Cong Yue Qiao, Menominee, MI (US); David Doll, Houston, TX (US); Todd Trudeau, Menominee, MI (US); Peter Vennema, Santa Fe, NM (US)

(73) Assignee: L.E. Jones Company, Menominee, MI (US)

( * ) Notice: Subject to any disclaimer, the term of this patent is extended or adjusted under 35 U.S.C. 154(b) by 91 days.

This patent is subject to a terminal disclaimer.

(21) Appl. No.: 15/147,087

(22) Filed: May 5, 2016

(65) Prior Publication Data
US 2016/0245132 A1   Aug. 25, 2016

Related U.S. Application Data

(63) Continuation of application No. 14/031,872, filed on Sep. 19, 2013, now Pat. No. 9,334,547.

(51) Int. Cl.
*C22C 38/22* (2006.01)
*C22C 38/30* (2006.01)
(Continued)

(52) U.S. Cl.
CPC ............... *F01L 3/02* (2013.01); *C21D 1/18* (2013.01); *C21D 1/25* (2013.01); *C21D 6/002* (2013.01);
(Continued)

(58) Field of Classification Search
None
See application file for complete search history.

(56) References Cited

U.S. PATENT DOCUMENTS 2,432,614 A * 12/1947 Franks .................... C22C 38/30
420/37
2,513,471 A *  7/1950 Franks .................... C22C 38/30
420/37
(Continued)

FOREIGN PATENT DOCUMENTS

CN     1445378 A     10/2003
CN     1541280 A     10/2004
(Continued)

OTHER PUBLICATIONS

J.H. Westbrook, "Temperature Dependence of the Hardness of Secondary phases Common in Turbine Bucket Alloys," pp. 898-904, Journal of Metals, Jul. 1957.*

(Continued)

*Primary Examiner* — Deborah Yee
(74) *Attorney, Agent, or Firm* — Buchanan Ingersoll & Rooney PC

(57) ABSTRACT

An iron-based alloy includes (in weight percent) carbon from about 1 to about 2 percent; manganese up to about 1 percent; silicon up to about 1 percent; nickel up to about 4 percent; chromium from about 10 to about 25 percent; molybdenum from about 5 to about 20 percent; tungsten up to about 4 percent; cobalt from about 17 to about 23 percent; vanadium up to about 1.5 percent; boron up to about 0.2 percent; sulfur up to about 0.03 percent; nitrogen up to about 0.4 percent; phosphorus up to about 0.06 percent; niobium up to about 4 percent; iron from about 35 to about 55 percent; and incidental impurities. The chromium/molybdenum ratio of the iron-based alloy is from about 1 to about 2.5. The alloy is suitable for use in elevated temperature applications, such as valve seat inserts for combustion engines.

20 Claims, 15 Drawing Sheets

(51) Int. Cl.

| | |
|---|---|
| *C22C 38/32* | (2006.01) |
| *C22C 38/44* | (2006.01) |
| *C22C 38/52* | (2006.01) |
| *C22C 38/54* | (2006.01) |
| *C22C 37/06* | (2006.01) |
| *C22C 37/08* | (2006.01) |
| *C22C 37/10* | (2006.01) |
| *C22C 30/00* | (2006.01) |
| *F01L 3/02* | (2006.01) |
| *C21D 9/00* | (2006.01) |
| *C21D 6/00* | (2006.01) |
| *C21D 6/02* | (2006.01) |
| *C21D 1/18* | (2006.01) |
| *C22C 38/56* | (2006.01) |
| *C22C 38/48* | (2006.01) |
| *C22C 38/46* | (2006.01) |
| *C22C 38/04* | (2006.01) |
| *C22C 38/00* | (2006.01) |
| *F16K 25/00* | (2006.01) |
| *C21D 1/25* | (2006.01) |
| *C22C 38/02* | (2006.01) |
| *C22C 38/24* | (2006.01) |
| *C22C 38/26* | (2006.01) |
| *C22C 38/36* | (2006.01) |

(52) U.S. Cl.
CPC .............. *C21D 6/004* (2013.01); *C21D 6/007* (2013.01); *C21D 6/02* (2013.01); *C21D 9/0068* (2013.01); *C22C 37/08* (2013.01); *C22C 37/10* (2013.01); *C22C 38/001* (2013.01); *C22C 38/002* (2013.01); *C22C 38/02* (2013.01); *C22C 38/04* (2013.01); *C22C 38/22* (2013.01); *C22C 38/24* (2013.01); *C22C 38/26* (2013.01); *C22C 38/30* (2013.01); *C22C 38/32* (2013.01); *C22C 38/36* (2013.01); *C22C 38/44* (2013.01); *C22C 38/46* (2013.01); *C22C 38/48* (2013.01); *C22C 38/52* (2013.01); *C22C 38/54* (2013.01); *C22C 38/56* (2013.01); *F16K 25/005* (2013.01); *C21D 6/005* (2013.01); *C21D 6/008* (2013.01); *C21D 2211/004* (2013.01); *C21D 2211/008* (2013.01); *Y10T 29/49409* (2015.01)

(56) References Cited

U.S. PATENT DOCUMENTS

| | | | |
|---|---|---|---|
| 2,704,250 A | 3/1955 | Payson | |
| 2,713,537 A | 7/1955 | Harris et al. | |
| 3,068,096 A | 12/1962 | Elbaum et al. | |
| 3,076,704 A | 2/1963 | Cape et al. | |
| 3,127,265 A | 3/1964 | Avery | |
| 3,834,901 A | 9/1974 | Kamiya et al. | |
| 3,850,621 A | 11/1974 | Haberling et al. | |
| 3,853,545 A * | 12/1974 | Kusaka | C22C 38/56 |
| | | | 420/102 |
| 3,982,905 A | 9/1976 | Osawa et al. | |
| 4,363,660 A | 12/1982 | Wakita et al. | |
| 4,765,955 A | 8/1988 | Yabuki et al. | |
| 5,466,276 A * | 11/1995 | Sato | C22C 33/0207 |
| | | | 419/14 |
| 7,235,116 B2 | 6/2007 | Rodrigues et al. | |
| 7,273,508 B2 | 9/2007 | Sato et al. | |
| 7,754,142 B2 | 7/2010 | Liang | |
| 8,733,313 B2 * | 5/2014 | Sato | C22C 1/0491 |
| | | | 123/188.8 |
| 9,334,547 B2 * | 5/2016 | Qiao | C21D 9/0068 |

FOREIGN PATENT DOCUMENTS

| | | |
|---|---|---|
| CN | 1745184 A | 3/2006 |
| CN | 102046824 A | 5/2011 |
| FR | 1312205 A | 12/1962 |
| GB | 929687 A | 6/1963 |
| WO | 2004067793 A2 | 8/2004 |

OTHER PUBLICATIONS

First Office Action dated Sep. 30, 2016 in corresponding Chinese Patent Application No. 2014-80051939.9 with English Translation, 14 pages.

Second Office Action dated May 15, 2017 in corresponding Chinese Patent Application No. 2014-80051939.9 with English Translation, 16 pages.

International Search Report and Written Opinion dated Dec. 4, 2014 for PCT/US2014/054089.

E.J. Chun et al., "Prediction of α-Phase Embrittlement in Type 316FR Weld Metal," Supplement to the Welding Journal, vol. 92, May 2013, pp. 133-138.

M.B. Cortie et al., "Experimental Processing of FeCr Sigma-Phase Powders," Materials Forum, vol. 29, 262-67 (2005).

Third Office Action dated Nov. 7, 2017 in corresponding Chinese Patent Application No. 2014-80051939.9 (7 pages).

* cited by examiner

IRON-BASED ALLOYS AND METHODS OF MAKING AND USE THEREOF

FIELD

The present disclosure relates to iron-based alloys. More specifically, the present disclosure pertains to iron-based alloys having a high hardness and compressive yield strength, which may be used for engine parts such as valve seat inserts.

BACKGROUND INFORMATION

More restrictive exhaust emissions laws for modern engines (such as, for example, diesel engines) have driven changes in engine design, including the need for high-pressure electronic fuel injection systems. Engines built according to the new designs use higher combustion pressures, higher operating temperatures, and less lubrication than previous designs. Components of the new designs, including valve seat inserts (VSI), have experienced significantly higher wear rates. Exhaust valve seat inserts and valves, for example, must be able to withstand a high number of valve impact events and combustion events with minimal wear (such as abrasive, adhesive, and corrosive wear).

Another emerging trend in diesel engine development is the use of exhaust gas recirculation (EGR). In the EGR technique, exhaust gas is partially routed back into the intake air stream to reduce nitric oxide ($NO_x$) content in exhaust emissions. The use of EGR in diesel engines can introduce harsher working conditions for valve seat inserts. Accordingly, there is a need for lower cost valve seat inserts having good hot hardness for use in diesel engines, such as diesel engines using EGR.

Additionally, exhaust gas contains compounds of nitrogen, sulfur, chlorine, and other elements that can potentially form acids. Acid can attack valve seat inserts and valves leading to premature engine failure. Accordingly, there is a need for improved corrosion resistance in alloys used in exhaust valve seat insert applications. Earlier attempts to achieve improved corrosion resistance were pursued through the use of martensitic stainless steels, but although these steels provide good corrosion resistance, conventional martensitic stainless steel do not have adequate wear resistance and hot hardness to meet the requirements for valve seat inserts in modern diesel engines.

There is a need in the art for improved iron-based alloys for valve seat inserts that exhibit adequate bulk hardness at elevated temperatures and compressive yield strength, as well as corrosion and wear resistance, which are suitable for use in exhaust valve seat insert applications.

SUMMARY

In embodiments, the present disclosure provides an iron-based alloy containing, in weight percent, carbon from about 1 to about 2 percent; manganese up to about 1 percent; silicon up to about 1 percent; nickel up to about 4 percent; chromium from about 10 to about 25 percent; molybdenum from about 5 to about 20 percent; tungsten up to about 4 percent; cobalt from about 17 to about 23 percent; vanadium up to about 1.5 percent; boron up to about 0.2 percent; sulfur up to about 0.03 percent; nitrogen up to about 0.4 percent; phosphorus up to about 0.06 percent; niobium up to about 4 percent; iron from about 35 to about 55 percent; and incidental impurities. In embodiments, the chromium/molybdenum ratio of the iron-based alloy is from about 1 to about 2.5.

In further embodiments, the iron-based alloy may consist essentially of, in weight percent, carbon from about 1.4 to about 1.9 percent; manganese up to about 1 percent; silicon up to about 1 percent; nickel up to about 1 percent; chromium from about 13 to about 19 percent; molybdenum from about 8 to about 14 percent; tungsten up to about 1 percent; cobalt from about 19 to about 22 percent; vanadium up to about 0.5 percent; niobium up to about 1 percent; nitrogen up to about 0.4 percent; phosphorus up to about 0.06 percent; sulfur up to about 0.03 percent; boron up to about 0.2 percent; iron from about 38 to about 51 percent; and incidental impurities.

In further embodiments, the alloy may contain, in weight percent, carbon from about 1.6 to about 1.9 percent; manganese from about 0.15 to about 0.35 percent; silicon from about 0.2 to about 0.6 percent; nickel from about 0.8 to about 4 percent; chromium from about 14 to about 16 percent; molybdenum from about 12 to about 14 percent; tungsten up to about 3 percent; cobalt from about 19 to about 21 percent; vanadium up to about 0.5 percent; boron from about 0.03 to about 0.15 percent; iron from about 38.5 to about 51 percent; and incidental impurities.

In embodiments, the present disclosure provides a valve seat insert for use in an internal combustion engine, where the valve seat insert may be made of an iron-based alloy containing, in weight percent, carbon from about 1 to about 2 percent; manganese up to about 1 percent; silicon up to about 1 percent; nickel up to about 4 percent; chromium from about 10 to about 25 percent; molybdenum from about 5 to about 20 percent; tungsten up to about 4 percent; cobalt from about 17 to about 23 percent; vanadium up to about 1.5 percent; boron up to about 0.2 percent; sulfur up to about 0.03 percent; nitrogen up to about 0.4 percent; phosphorus up to about 0.06 percent; niobium up to about 4 percent; iron from about 35 to about 55 percent; and incidental impurities. In embodiments, the chromium/molybdenum ratio of the iron-based alloy is from about 1 to about 2.5.

In embodiments, the present disclosure further provides a method of manufacturing a valve seat insert. In embodiments, the method involves preparing an iron-based alloy comprising, in weight percent, carbon from about 1 to about 2 percent; manganese up to about 1 percent; silicon up to about 1 percent; nickel up to about 4 percent; chromium from about 10 to about 25 percent; molybdenum from about 5 to about 20 percent; tungsten up to about 4 percent; cobalt from about 17 to about 23 percent; vanadium up to about 1.5 percent; boron up to about 0.2 percent; sulfur up to about 0.03 percent; nitrogen up to about 0.4 percent; phosphorus up to about 0.06 percent; niobium up to about 4 percent; iron from about 35 to about 55 percent; and incidental impurities. In embodiments, the chromium/molybdenum ratio of the iron-based alloy is from about 1 to about 2.5. In embodiments, the method further involves hardening the iron-based alloy at a temperature of from about 1500° F. to about 1700° F., and tempering the iron-based alloy at a temperature of from about 600° F. to about 1500° F.

DETAILED DESCRIPTION

In embodiments, the present disclosure provides an iron-based alloy useful for a valve seat insert, which will now be described in detail with reference to a few embodiments thereof as illustrated in the accompanying drawings. In the following description, numerous specific details are set forth in order to provide a thorough understanding of the iron-based alloy. It will be apparent, however, to one of ordinary skill in the art that embodiments herein may be practiced without some or all of these specific details. In other instances, well known process steps and/or structures have not been described in detail, so as to not unnecessarily obscure the iron-based alloy.

In this specification and the claims that follow, singular forms such as "a", "an", and "the" may also include plural forms unless the content clearly dictates otherwise.

Unless otherwise indicated, all numbers expressing quantities, conditions, and the like in the instant disclosure and claims are to be understood as modified in all instances by the term "about." The term "about" refers, for example, to numerical values covering a range of plus or minus 10% of the numerical value.

The terms "room temperature," "ambient temperature," and "ambient" refer, for example, to a temperature of from about 20° C. to about 25° C.

Figure 1:
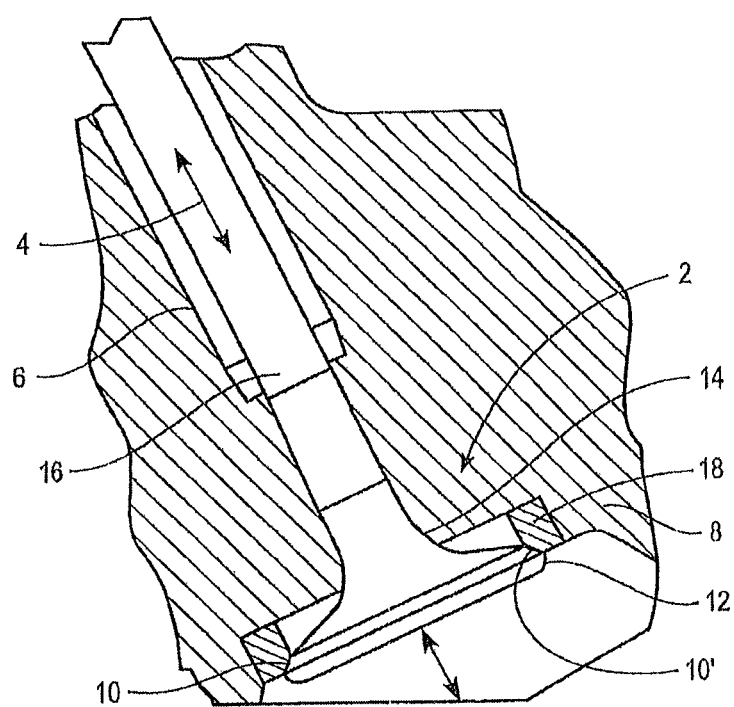
FIG. 1 is a cross-sectional view of a valve assembly incorporating a valve seat insert of an iron-based alloy according to an embodiment of the disclosure (referred to herein as the J513 alloy).

FIG. 1 illustrates an engine valve assembly 2 according to the instant disclosure. Valve assembly 2 includes a valve 4, which may be slideably supported within the internal bore of a valve stem guide 6 and valve seat insert 18. The valve stem guide 6 is a tubular structure that fits into the cylinder head 8 of an engine. Arrows indicate the direction of motion of the valve 4. Valve 4 includes a valve seat face 10 interposed between the cap 12 and neck 14 of the valve 4. Valve stem 16 is positioned above neck 14 and is received within valve stem guide 6. The valve seat insert 18 includes a valve seat insert face 10' and is mounted, such as by press-fitting, within the cylinder head 8 of the engine. In embodiments, the cylinder head 8 may comprise a casting of cast iron, aluminum, or aluminum alloy. In embodiments, the insert 18 (shown in cross section) is annular in shape and the valve seat insert face 10' engages the valve seat face 10 during movement of valve 4.

In embodiments, the present disclosure relates to an iron-based alloy (hereinafter referred to as the "J513 alloy" or "J513"). The sustained high-level bulk hardness after tempering treatment at an elevated temperature (i.e., greater than 1000° F.), compressive yield strength, erosion resistance, corrosion resistance, dimensional stability, toughness, cracking resistance, and wear resistance of the J513 alloy make it useful in a variety of applications including, for example, as a valve seat insert for an internal combustion engine, and in ball bearings, coatings, and the like. In embodiments, the alloy is used as a valve seat insert for an internal combustion engine.

In embodiments, the J513 alloy comprises, in weight percent, carbon from about 1 to about 2 percent; manganese up to about 1 percent; silicon up to about 1 percent; nickel up to about 4 percent; chromium from about 10 to about 25 percent; molybdenum from about 5 to about 20 percent; tungsten up to about 4 percent; cobalt from about 17 to about 23 percent; vanadium up to about 1.5 percent; boron up to about 0.2 percent; sulfur up to about 0.03 percent; nitrogen up to about 0.4 percent; phosphorus up to about 0.06 percent; niobium up to about 4 percent; iron from about 35 to about 55 weight percent; and incidental impurities. In embodiments, the chromium/molybdenum ratio of the iron-based alloy is from about 1 to about 2.5.

The term "chromium/molybdenum ratio" refers, for example, to the ratio of the chromium content in the alloy (in weight percent) to the molybdenum content of the alloy (in weight percent) and may be generally represented by the formula:

$$\text{Chromium/Molybdenum Ratio} = \frac{\text{Chromium Content(in weight percent)}}{\text{Molybdenum content(in weight percent)}}$$

In embodiments, the J513 alloy can have optional additions of other alloying elements, or can be free of intentional additions of such elements. In embodiments, the balance of the J513 alloy is iron and incidental impurities. In embodiments, iron may be present in the alloy in an amount of from about 35 to about 55 weight percent, or from about 37 to about 52 weight percent, or from about 38 to about 51 weight percent, or from about 41 to about 51 weight percent.

In embodiments, the alloy may contain from 0 to about 1.5 weight percent of other elements (such as less than about 1 weight percent, or less than about 0.5 weight percent), such as, for example, aluminum, arsenic, bismuth, copper, calcium, magnesium, nitrogen, phosphorus, lead, sulfur, tin, titanium, yttrium and rare earth elements (lanthanides), zinc, tantalum, selenium, hafnium, and zirconium. In embodiments, sulfur may be present in an amount of less than about 0.03 weight percent, such as from zero to about 0.02 weight percent, or from about 0.008 to about 0.015 weight percent sulfur. In embodiments, phosphorus may be present in the alloy in an amount less than about 0.06 weight percent, such as from zero to about 0.05 weight percent, or from about 0.001 to about 0.03 weight percent, or from about 0.01 to about 0.02 weight percent phosphorus. In embodiments, nitrogen may be present in the alloy in an amount less than about 0.4 weight percent, such as from zero to about 0.4 weight percent, or from about 0.1 to about 0.3 weight percent, or from about 0.1 to about 0.25 weight percent, or from about 0.15 to about 0.25 weight percent nitrogen.

In embodiments, the J513 alloy comprises, in weight percent, carbon from about 1.6 to about 1.9 percent; manganese from about 0.15 to about 0.35 percent; silicon from about 0.2 to about 0.6 percent; nickel from about 0.8 to about 4 percent; chromium from about 14 to about 16 percent; molybdenum from about 12 to about 14 percent; tungsten up to about 3 percent; cobalt from about 19 to about 21 percent; vanadium up to about 0.5 percent; boron up to about 0.2 percent; iron from about 38 to about 51 percent; and incidental impurities.

In embodiments, the J513 alloy consists essentially of, in weight percent, carbon from about 1.4 to about 1.9 percent; manganese up to about 1 percent; silicon up to about 1 percent; nickel up to about 1 percent; chromium from about 13 to about 19 percent; molybdenum from about 8 to about 14 percent; tungsten up to about 1 percent; cobalt from about 19 to about 22 percent; vanadium up to about 0.5 percent; niobium up to about 1 percent; nitrogen up to about 0.4 percent; phosphorus up to about 0.06 percent; sulfur up to about 0.03 percent; boron up to about 0.2 percent; iron from about 38 to about 51 percent; and incidental impurities.

As used herein, the terms "consists essentially of" or "consisting essentially of" have a partially closed meaning—that is to say, such terms exclude steps, features, or components which would substantially and adversely change the basic and novel properties of the alloy (i.e., steps or features or components which would have a detrimental effect on the desired properties of the J513 alloy). The basic and novel properties of the J513 alloy may include at least one of the following: hardness, high hardenability, such as bulk hardness under high tempering temperature conditions; wear resistance; toughness and cracking resistance; compressive yield strength; ultimate tensile strength; aqueous corrosion resistance; erosion resistance; dimensional stability; hot hardness; and alloy microstructure.

In embodiments, the J513 alloy may be processed to achieve a combination of hardness, high hardenability, compressive yield strength, aqueous corrosion resistance, erosion resistance, corrosion resistance, and dimensional stability suitable for valve seat inserts in the hardened and tempered condition. The J513 alloy may be processed according to any suitable technique. Techniques for processing the J513 alloy include, for example, powder metallurgy, casting, hot working, thermal/plasma spraying, weld overlay, laser cladding, surface modification, such as induction hardening, heat treatment, and the like.

In embodiments, the J513 alloy may be formed into a powder material by various techniques including, for example, ball milling elemental powders or atomization to form pre-alloyed powder. In embodiments, the powder material can be compacted into a desired shape of a part and sintered. The sintering process may be used to achieve desired properties in the part.

Valve seat inserts may be manufactured by casting, which is a known process involving melting alloy constituents and pouring the molten mixture into a mold. In embodiments, the alloy castings may be subsequently hardened and tempered before machining into a final shape.

In embodiments, the J513 alloy may be used in the manufacture of valve seat inserts including, for example, valve seat inserts for use in diesel engines, such as diesel engines with or without EGR, natural gas engines, and duel fuel engine valve train applications. The J513 alloy may also find utility in other applications. For example, the J513 alloy may be used in valve seat inserts made for gasoline, natural gas, bi-fuel, or alternatively fueled internal combustion engines. In embodiments, J513 alloy valve seat inserts may be manufactured by conventional techniques.

The J513 alloy may also find utility in other applications where high temperature properties are advantageous, such as wear resistant coatings, internal combustion engine components, and diesel engine components.

In embodiments, multiple matrix strengthening mechanisms may be employed in J513 matrix strengthening. For example, in embodiments, sigma phase strengthening may be used as one of the major designed strengthening phases in the J513 alloy. Without being bound to any particular theory, it is believed that using sigma phase as one of the major strengthening phases in developing the J513 alloy yields superior mechanical properties (including bulk hardness, compressive yield strength, dimensional stability, and corrosion resistance) that can be sustained from ambient temperatures (i.e., from about 20° C./68° F. to about 25° C./77° F.) to elevated temperatures, such as greater than about 1000° F., or greater than about 1100° F., or greater than about 1200° F.

In the general steel-making industry, sigma phase formation during casting, forging, or welding processes is often considered undesirable—sigma phase is a hard phase, and may cause embrittlement. Sigma phase may be formed during solidification or during precipitation. Sigma phase may be formed under elevated temperature conditions (for example, temperatures of from about 1050° F. to about 1800° F., such as during casting, rolling, welding, forging, aging, and so forth), particularly when chromium content is greater than about 20%, such as greater than about 30%, or greater than about 50%. At temperatures less than 300° F., sigma phase may exhibit a strain intolerant behavior. However, at higher temperatures (such as temperatures suitable as engine valve train service temperatures), it is believed that the sigma phase has minimal effect on matrix toughness.

In iron-based alloys, FeCr, sigma phase, is an iron-chromium intermetallic compound which contains, in weight percent, from about 42 to about 50 percent chromium, such as from about 45 to 49 percent chromium, or about 47 percent chromium. The sigma phase can form in a wide range of Fe—Cr systems. Traditionally, precipitation of sigma phase under an elevated temperature environment (such as during casting, rolling, welding, forging, aging, and so forth) would enhance the strength but reduce the ductility of an iron based alloy—accordingly, it would generally be avoided. However, in the J513 alloy, the existence of uniformly-distributed high chromium concentration regions enables sigma phase formation with a properly designed thermal treatment, thereby achieving fine and uniform distribution of the sigma phase—that is to say, the J513 alloy is designed such that sigma phase forms not only on the grain boundary, but distributes evenly and finely in the J513 matrix. Because the sigma phase is fine and dispersively distributed in the J513 matrix (for example, from about 3 to about 9 volume percent sigma phase, such as from about 4 to about 8 volume percent, or from about 5 to about 7 volume percent, distributed continuously throughout the J513 matrix), the ductility of the J513 alloy is not expected to drop significantly.

In embodiments, other matrix strengthening mechanisms may also be involved in J513 matrix strengthening. For example, in embodiments, matrix strengthening mechanisms such as Laves phase and MC-type carbides may be involved in J513 matrix strengthening. Traditionally, primary carbide strengthening was a predominant alloy strengthening approach used for valve seat insert alloys, but traditional carbide strengthening alone may not be sufficient to provide satisfactory high temperature strength, hardness, and wear resistance. By using multiple matrix strengthening mechanisms—such as by using a balanced approach of intermetallic (sigma phase and Laves phase) and carbide strengthening mechanisms—the J513 alloy achieves high temperature strength and hardness, along with significant wear resistance properties.

The improved wear resistance and strength of the J513 alloy may be attributed to the microstructure of the alloy. In embodiments, the alloy system may be constructed by Co—Cr—Mo—Fe multiple alloy elements to produce the desired J513 microstructure. In embodiments, the microstructure contains approximately equal amounts of interdendritic and intradendritic phases; for example, in embodiments, the ratio of interdendritic to intradendritic phases may be from about 40:60 to about 60:40, such as from about 45:55 to about 55:45, or about 50:50. The term "interdendritic" refers, for example, the regions existing between dendrites, and the term "intradendritic" refers, for example, to the regions existing within the dendrites. In embodiments, in the hardened and tempered condition, the J513 alloy microstructure may contain tempered martensite, high chromium/molybdenum FCC phases, and a small amount of sigma phase and carbide precipitation. For example, in embodiments, the alloy is in a hardened and tempered condition, and contains sigma phase in an amount of from about 3 to about 9 volume percent, such as from about 5 to about 9 volume percent, or from about 6 to about 8 volume percent.

In embodiments, the J513 alloy may have a bulk hardness of at least HRc 50, such as greater than about 53 HRc, or greater than about 55 HRc, or greater than about 60 HRc. For example, in embodiments, the J513 alloy may have a bulk hardness of from about 50 to about 70 HRc at temperatures from about room temperature to about 1350° F., such as from about 53 to about 65 HRc, or from about 55 to about 63 HRc. In embodiments, the J513 alloy may have a bulk hardness of at least about HRc 50, such as greater than about 53 HRc, or greater than about 55 HRc, or greater than about 60 HRc, or from about 50 to about 70 HRc, or from about 55 to about 65 HRc, at temperatures greater than about 1000° F., such as from about 1350° F. to about 1500° F., or from about 1350° F. to about 1450° F.

Compressive yield strength and ultimate tensile strength are desirable mechanical properties for valve seat insert applications, as an increase in these mechanical strengths will generally augment wear resistance, cracking resistance, and insert retention capability in valve seat insert alloys. In embodiments, the J513 alloy valve seat insert may have a compressive yield strength of at least about 175 ksi at room temperature (that is, at a temperature of about 75° F.), such as greater than about 200 ksi, or greater than about 220 ksi, or greater than about 240 ksi. In embodiments, the J513 alloy valve seat insert may have a compressive yield strength of from about 225 to about 255 ksi, such as from about 230 to about 250 ksi. In embodiments, the alloy may have a compressive yield strength of from about 185 to about 250 ksi at temperatures from about room temperature to about 1000° F., such as from about 200 to about 240 ksi.

In embodiments, the J513 alloy may have an ultimate tensile strength of from about 75 to about 120 ksi at temperatures from about room temperature to about 1200° F. For example, in embodiments, the J513 alloy may have an ultimate tensile strength of from about 80 to about 90 ksi at about 75° F., and an ultimate tensile strength of from about 75 to about 85 ksi at 1200° F.

In embodiments, the J513 alloy may be in a hardened and tempered condition, and may have a linear thermal expansion coefficient suitable for use in valve seat insert applications. For example, in embodiments, the J513 alloy may have a linear thermal expansion coefficient of from about $5.7 \times 10^{-6}$ mm/mm° F. to about $6.8 \times 10^{-6}$ mm/mm° F., such as from about $5.9 \times 10^{-6}$ mm/mm° F. to about $6.75 \times 10^{-6}$ mm/mm° F.

In embodiments, the J513 alloy may have a Vickers hot hardness (HV10) from about 500 to about 700 HV10 at a temperature of from about 600° F. to about 800° F., such as from about 550 to about 650 HV10. In embodiments, the J513 alloy may have a Vickers hot hardness of from about 150 to about 220 HV10 at a temperature of about 1600° F., such as from about 190 to about 210 HV10.

In embodiments, the J513 alloy may exhibit a dimensional changing rate of less than about $6 \times 10^{-4}$ inches per inch change in insert outside diameter (O.D.) after aging for about 20 hours at about 1200° F., such as less than about $4 \times 10^{-4}$ inch per inch, or less than about $3.8 \times 10^{-4}$ inch per inch, or less than about $3.6 \times 10^{-4}$ inch per inch.

In embodiments, the J513 alloy contains a suitable amount of chromium. Chromium can promote formation of the iron-chromium intermetallic sigma phase compound, and also serves as a carbide and ferrite former. Chromium may be present in the alloy in an amount of from about 10 to about 25 weight percent, such as from about 12 to about 20 weight percent, or from about 13 to about 19 weight percent, or from about 14.5 to about 17 weight percent. In a preferred embodiment, the alloy may contain from about 14 to about 16 weight percent chromium, such as from about 14.5 to about 15.5 weight percent chromium.

Molybdenum may also promote formation of the sigma phase (in some cases, molybdenum may be even more effective at causing sigma phase formation than chromium, particularly at elevated temperatures, such as temperatures greater than about 900° F.). Molybdenum also promotes Laves phase formation. For example, in the presence of cobalt, molybdenum may promote formation of cobalt-molybdenum intermetallic Laves phases, which increases the strength of the J513 alloy. In embodiments, molybdenum may be present in the alloy in an amount of from about 5 to about 20 weight percent, such as from about 6 to about 17 weight percent, or from about 7 to about 15 weight percent, or from about 8 to about 14 weight percent. In a preferred embodiment, the alloy may contain from about 12 to about 14 weight percent molybdenum, such as from about 12.5 to about 13.5 weight percent molybdenum. The relatively high molybdenum content of the alloy (in particular within the range of from about 12 to about 14 weight percent) improves the toughness of the alloy and leads to improved cracking resistance.

In embodiments, the sum of the chromium and molybdenum content in the alloy may be from about 20 to about 35 weight percent, such as from about 25 to about 30 weight percent, or from about 27 to about 29 weight percent, or about 28 weight percent. In embodiments, the chromium/molybdenum ratio in the alloy is selected to promote formation of the sigma phase. For example, in embodiments, the chromium/molybdenum ratio in the alloy may be from about 1 to about 2.5, such as from about 1 to about 2, or from about 1.2 to about 1.7, or from about 1.25 to about 1.35. As discussed above, the use of sigma phase strengthening (in combination with other strengthening mechanisms) allows the J513 alloy to achieve high temperature strength and hardness, as well as significant wear resistance properties, including cracking resistance.

Cobalt also provides for enhanced Laves phase formation—for example, in embodiments, cobalt promotes formation of cobalt-molybdenum intermetallic Laves phases, as discussed above. In embodiments, the alloy may contain cobalt in an amount of from about 17 to about 23 weight percent, such as from about 18 to about 22 weight percent, or from about 18.5 to about 21.5 weight percent. In a preferred embodiment, the alloy may contain from about 19 to about 21 weight percent cobalt, such as from about 19.5 to about 20.5 weight percent cobalt.

In embodiments, the J513 alloy may contain carbon in an amount of from about 1 to about 2 weight percent, such as from about 1.3 to about 2.0 weight percent, or from about 1.4 to about 1.9 weight percent. In a preferred embodiment, the J513 alloy may contain carbon in an amount of from about 1.6 to about 1.9 weight percent, such as from about 1.6 to about 1.8 weight percent, or about 1.75 weight percent. Carbon is a carbide former and, in suitable amounts, promotes formation of a fine cellular solidification substructure in the alloy castings. In embodiments, the carbon concentration of the alloy is such that the alloy is free of primary carbides. In embodiments, the alloy comprises secondary carbides, which are finer than primary carbides.

In embodiments, the J513 alloy may contain manganese in an amount up to about 1 weight percent, such as from 0 to about 1 weight percent, or from about 0.1 to about 0.5 weight percent, or from about 0.15 to about 0.45 weight percent, or from about 0.2 to about 0.4 weight percent. In a preferred embodiment, the alloy may contain from about 0.15 to about 0.35 weight percent manganese, such as from about 0.15 to about 0.25, or from about 0.2 to about 0.3 weight percent manganese.

In embodiments, the alloy may contain up to about 1 weight percent silicon, such as from 0 to about 1 weight percent silicon, or from about 0.01 to about 0.8 weight percent silicon, or from about 0.2 to about 0.7 weight percent silicon. In a preferred embodiment, the alloy may contain from about 0.2 to about 0.6 weight percent silicon, such as from about 0.25 to about 0.4 weight percent silicon.

In embodiments, the alloy may contain up to about 4 weight percent nickel. Nickel is an austenite former—if nickel is present in too great an amount, the amount of austenite produced in the resulting alloy may yield lower bulk hardness results. In embodiments, the J513 alloy may contain, for example, from zero to about 4 weight percent nickel, such as from about 0.01 to about 3 weight percent, or from about 0.3 to about 2 weight percent nickel. In embodiments, the nickel content of the alloy may be less than about 2 weight percent. For example, in embodiments, nickel may be present in an amount up to about 1 weight percent, such as up to about 0.6 weight percent nickel. In a preferred embodiment, the alloy may contain from about 0.8 to about 4 weight percent nickel, such as from about 1.5 to about 3 weight percent nickel.

In embodiments, the alloy may contain up to about 4 weight percent tungsten, such as from 0 to about 4 weight percent tungsten, or up to about 3 percent tungsten, or from about 1 to about 3 weight percent tungsten, or up to about 1 weight percent tungsten, or up to about 0.25 weight percent tungsten.

In embodiments, the alloy may contain up to about 1.5 weight percent vanadium, such as from zero to about 1.5 weight percent vanadium, or from about 0.001 to about 1.5 weight percent vanadium, or up to about 0.1 weight percent vanadium, or from about 0.01 to about 0.08 weight percent vanadium, or from about 0.01 to about 0.05, or from about 0.02 to about 0.05 weight percent vanadium. In a preferred embodiment, vanadium may be present in an amount up to about 0.5 weight percent.

In embodiments, niobium may be present in the J513 alloy in an amount up to about 4 weight percent, such as from about 0.001 to about 3.5 weight percent, or from about 0.01 to about 2 weight percent, or from about 0.1 to about 1 weight percent, or from about 0.1 to about 0.2 weight percent niobium.

In embodiments, boron, which has a very low solubility in iron (e.g., about 0.01 weight percent), may be present in the alloy in an amount up to about 0.2 weight percent, such as from zero to about 0.2 weight percent, or from about 0.001 to about 0.15 weight percent, or from about 0.01 to about 0.1 weight percent. In a preferred embodiment, the alloy may contain boron in an amount of from about 0.03 to about 0.15 weight percent.

EXAMPLES

The following examples are illustrative of different compositions and conditions which may be used in practicing the embodiments of the present disclosure. All parts and proportions are by weight unless otherwise indicated. It will be apparent, however, that the embodiments may be practiced with many types of compositions and can have many uses in accordance with the disclosure above and as pointed out hereinafter.

The effects of compositional changes were explored by varying the composition of various experimental alloys. The compositions of Experimental Heats 1-11 are set forth in Table 1. Properties of the J513 alloy are discussed below.

TABLE 1

Composition of Experimental Heats 1-11 (Weight Percent)

| Heat | C | Mn | Si | Ni | Cr | Mo | Co | Nb | W | V | Fe | N | P | S |
|---|---|---|---|---|---|---|---|---|---|---|---|---|---|---|
| 1 8L17XA | 1.498 | 0.381 | 0.608 | 0.554 | 13.46 | 0.089 | 21.48 | 0.002 | 0.215 | 0.01 | 61.28 | 0.192 | 0.014 | 0.009 |
| 2 8L18XA | 1.299 | 0.405 | 0.692 | 0.122 | 13.04 | 0.031 | 21.48 | 0.002 | 0.053 | 0.010 | 61.6 | 0.205 | 0.013 | 0.008 |
| 3 8L22XA | 1.558 | 0.261 | 0.195 | 0.073 | 16.68 | 0.022 | 21.48 | 0.002 | 0.021 | 0.009 | 58.28 | 0.229 | 0.013 | 0.009 |
| 4 8L23XA | 1.395 | 0.399 | 0.623 | 0.053 | 16.96 | 0.02 | 21.48 | 3.018 | 0.015 | 0.015 | 54.49 | 0.242 | 0.012 | 0.010 |
| 5 8L23XB | 1.606 | 0.368 | 0.62 | 0.048 | 16.62 | 7.25 | 21.48 | 0.048 | 0.026 | 0.026 | 50.76 | 0.211 | 0.018 | 0.01 |
| 6 9A05XA | 1.595 | 0.327 | 0.45 | 0.048 | 17.14 | 13.82 | 21.48 | 0.036 | 0.113 | 0.038 | 43.94 | 0.147 | 0.023 | 0.011 |
| 7 9A05XB | 1.532 | 0.388 | 0.540 | 0.067 | 13.31 | 0.083 | 21.48 | 0.002 | 0.014 | 0.009 | 61.18 | 0.212 | 0.012 | 0.008 |
| 8 9A06XA | 1.554 | 0.37 | 0.642 | 0.051 | 17.07 | 0.02 | 21.48 | 3.037 | 0.016 | 0.014 | 53.91 | 0.218 | 0.012 | 0.01 |
| 9 9A06XB | 1.465 | 0.415 | 0.665 | 0.07 | 17.11 | 0.026 | 21.48 | 0.002 | 0.015 | 0.009 | 57.32 | 0.203 | 0.013 | 0.01 |
| 10 9A07XA | 1.395 | 0.4 | 0.632 | 0.05 | 17.00 | 7.28 | 21.48 | 0.002 | 0.033 | 0.026 | 50.83 | 0.215 | 0.019 | 0.011 |
| 11 9A07XB | 1.476 | 0.369 | 0.688 | 0.042 | 16.83 | 13.26 | 21.48 | 0.002 | 0.058 | 0.038 | 44.95 | 0.162 | 0.024 | 0.011 |

Additional experimental alloy samples were prepared having the following elemental composition:

TABLE 2

Composition of Experimental Heats 12-24 (Weight Percent)

| Heat | C | Mn | Si | Cr | Mo | Co | Fe | Ni | W | B | N |
|---|---|---|---|---|---|---|---|---|---|---|---|
| 12 3A22O | 1.17 | 0.18 | 0.33 | 16.39 | 12.11 | 18.93 | 35.17 | 11.09 | 3.39 | 0.01 | 0.23 |
| 13 3A24XA | 2.01 | 0.16 | 0.27 | 15.72 | 12.22 | 18.91 | 34.96 | 11.20 | 3.32 | 0.02 | 0.23 |
| 14 3A29XA | 2.08 | 0.20 | 0.35 | 16.28 | 12.02 | 19.88 | 42.46 | 4.46 | 1.25 | 0.01 | 0.25 |
| 15 3B05XA | 2.05 | 0.19 | 0.38 | 15.95 | 12.25 | 20.00 | 44.19 | 2.62 | 1.33 | 0.01 | 0.26 |
| 16 3C18XA | 1.13 | 0.17 | 0.24 | 16.41 | 11.91 | 18.55 | 37.11 | 11.64 | 1.80 | 0.01 | 0.21 |
| 17 3C18XB | 2.93 | 0.19 | 0.33 | 16.06 | 11.44 | 19.14 | 34.34 | 11.10 | 3.31 | 0.01 | 0.19 |
| 18 3D13XA | 1.15 | 0.14 | 0.21 | 16.31 | 12.04 | 18.17 | 38.14 | 12.03 | 0.89 | 0.01 | 0.22 |
| 19 3D19XA | 1.12 | 0.19 | 0.23 | 17.11 | 11.85 | 18.21 | 38.08 | 11.86 | 0.45 | 0.003 | 0.22 |
| 20 3B20O | 1.78 | 0.23 | 0.30 | 14.51 | 12.19 | 19.27 | 47.14 | 2.05 | 1.45 | 0.06 | 0.24 |
| 21 3C05F | 1.78 | 0.21 | 0.31 | 14.75 | 12.02 | 19.39 | 46.76 | 2.19 | 1.48 | 0.05 | 0.25 |
| 22 3D01B | 1.77 | 0.23 | 0.32 | 14.86 | 12.04 | 19.25 | 46.47 | 2.19 | 1.72 | 0.04 | 0.26 |
| 23 3E14C | 1.62 | 0.22 | 0.36 | 14.70 | 12.06 | 19.24 | 46.64 | 2.39 | 1.73 | 0.04 | 0.24 |
| 24 3E14D | 1.65 | 0.20 | 0.30 | 14.74 | 12.10 | 19.32 | 45.86 | 3.03 | 1.70 | 0.04 | 0.25 |

Example 1: Bulk Hardness

Experimental heats 1 and 2 compared the effect of carbon content on the alloy bulk hardness. No significant difference in hardness as a function of tempering temperature was detected.

Experimental heats 3, 4, and 5 were made with higher targeted chromium contents than experimental heats 1 and 2. In addition, experimental heat 4 contained approximately 3.0 weight percent niobium, and experimental heat 5 contained approximately 7.25 weight percent molybdenum. Experimental heat 5 showed a significantly higher hardness than experimental heats 1 and 2 when parts were tempered within a temperature range between 900° F. and 1500° F. Accordingly, it was determined that the addition of molybdenum in the alloy system substantially impacted the alloy tempering response. The rate of hardness decrease as tempering temperature increased was significant for the heat with additional molybdenum (Experimental Heat 5) in a temperature range of 900° F. through 1450° F. When the tempering temperature was 1500° F. or greater, the hardness began to increase due to a significant air quenching effect (in other words, the effect of quench hardening on the alloy, where the alloy has been air quenched).

Experimental Heat 6 contained 13.82 weight percent molybdenum and 17.14 weight percent chromium, while experimental heat 7 contained essentially no molybdenum (0.083 weight percent) but 13.31 weight percent chromium. Experimental heat 6 exhibited significantly higher hardness than experimental heat 7.

Experimental heats 8 and 9 repeated the test regarding the effect of niobium concentration on hardness using different tempering temperatures, with a slightly higher carbon concentration than in experimental heat 5.

The tempering response can be used to assess an alloy's high temperature performance and capability for thermal shock resistance. The hardness measurement result with various tempering conditions for Experimental Heats 1-11 is set forth in Table 3.

TABLE 3

Summary of Hardness Measurement Results

| Tempering Temperature (° F.) | Heat 1 | Heat 2 | Heat 3 | Heat 4 | Heat 5 | Heat 6 | Heat 7 | Heat 8 | Heat 9 | Heat 10 | Heat 11 |
|---|---|---|---|---|---|---|---|---|---|---|---|
| 75 | 57.7 | 57.8 | 57.4 | 55.1 | 58.5 | 61.4 | 52.9 | 53.8 | 56.6 | 58.8 | 61.4 |
| 300 | — | 58.4 | 58.6 | 55.9 | 59.7 | 62.2 | 55.4 | 56 | 56.2 | 58.5 | 61.4 |
| 400 | — | 58.7 | 58.3 | 54.7 | 59.3 | 61.8 | 57.5 | 55.4 | 56 | 58 | 61.2 |

TABLE 3-continued

Summary of Hardness Measurement Results

| Tempering Temperature (° F.) | Heat 1 | Heat 2 | Heat 3 | Heat 4 | Heat 5 | Heat 6 | Heat 7 | Heat 8 | Heat 9 | Heat 10 | Heat 11 |
|---|---|---|---|---|---|---|---|---|---|---|---|
| 500 | — | 58.5 | 58.7 | 54.7 | 59.3 | 61.6 | 55.7 | 55.4 | 56.3 | 57.8 | 60.6 |
| 600 | — | 59.2 | 58.4 | 55.5 | 59.2 | 62.1 | 53.6 | 55.7 | 56.8 | 58.1 | 60.7 |
| 700 | 58 | 59.7 | 59.8 | 55.6 | 60.1 | 63.1 | 54.5 | 56.9 | 57.4 | 59.3 | 61.6 |
| 800 | — | 61.1 | 59.3 | 56.5 | 61 | 64.3 | 54.3 | 58.3 | 59.5 | 60.3 | 62.5 |
| 900 | 59.6 | 61.4 | 60.3 | 58.1 | 63.2 | 64.8 | 58.7 | 58.7 | 60.1 | 62.1 | 63.8 |
| 950 | — | 60.1 | 59.3 | 52.1 | 61.7 | 64.4 | 60.5 | 57.5 | 58.1 | 62.1 | 63.9 |
| 1000 | — | 51.4 | 51.7 | 51.8 | 61.6 | 64.4 | 53.5 | 53.5 | 54.5 | 60.9 | 63.6 |
| 1050 | — | 48.4 | 48.1 | 49.6 | 59.8 | 62.7 | 49.3 | 51.3 | 50.9 | 58.9 | 62.3 |
| 1100 | 45.8 | 46.7 | 47.1 | 49 | 59 | 62.5 | 44.3 | 50.2 | 48.1 | 58.1 | 61.2 |
| 1150 | — | 44.9 | 46.3 | 48.8 | 57.3 | 61.1 | 44.6 | 50.5 | 47.4 | 56.1 | 59.8 |
| 1200 | — | 45 | 46.5 | 48.2 | 54.1 | 60 | 43.4 | 49 | 47.4 | 54.1 | 58.1 |
| 1250 | — | 43.3 | 46.5 | 47.5 | 53.3 | 59.3 | 42.9 | 49 | 47.3 | 53 | 56.7 |
| 1300 | 44 | 42.6 | 44.8 | 46.7 | 52.8 | 58.2 | 43 | 47.7 | 46.1 | 52 | 55.8 |
| 1350 | — | 41.7 | 43.8 | 46.2 | 53.1 | 57.8 | 39.3 | 46.2 | 45.9 | 51.3 | 55.2 |
| 1400 | — | 40 | 42.9 | 45.6 | 53 | 57 | 39.6 | 46.1 | 44.4 | 51.9 | 54.9 |
| 1450 | | 40.9 | 43.1 | 48.2 | 52.5 | 57.4 | 40.1 | 46.1 | 45 | 55.7 | 53.1 |
| 1500 | 40 | 44.1 | 42.9 | 49.8 | 55.1 | 60.3 | 40.2 | 50 | 48.2 | 59 | 54.8 |

Figure 2:
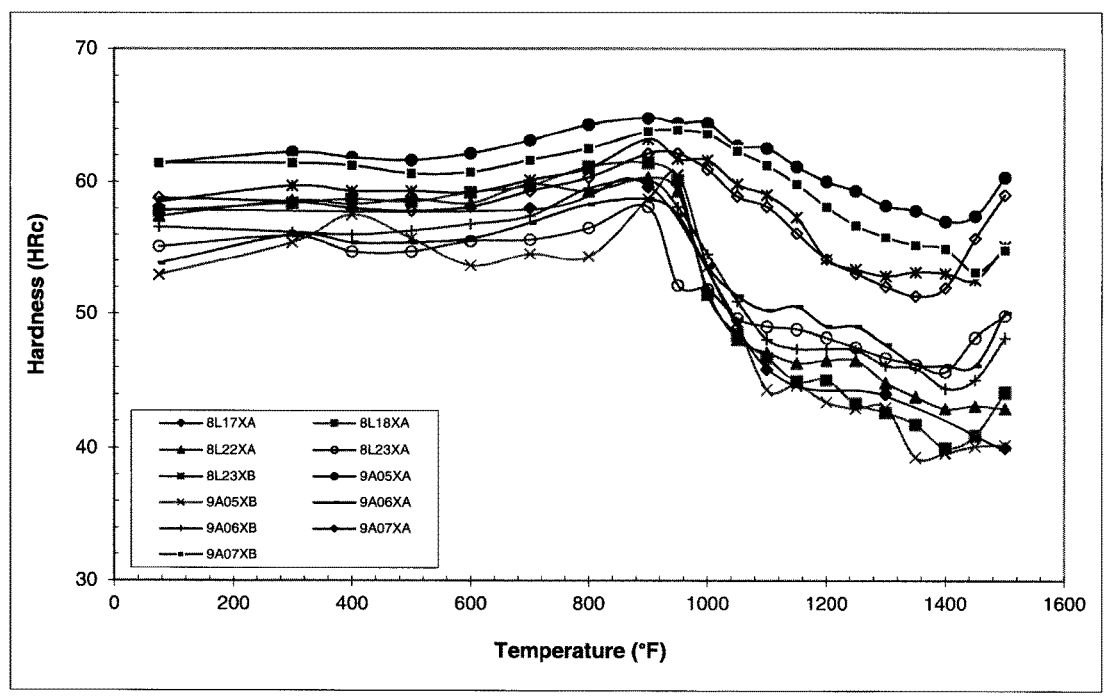
FIG. 2 is a graphical representation of hardness as a function of tempering temperature for several experimental alloy heats (experimental heats 1-11).

The tempering behavior results of Experimental Heats 1-11 are illustrated in FIG. 2. Bulk hardness was characterized by Rockwell hardness tests, scale C (i.e., HRc). As shown in FIG. 2, the hardness curves of the four experimental heats containing molybdenum in an amount of from 7.25 weight percent to 13.82 weight percent (experimental heats 5, 6, 10, and 11) may be grouped in a band at a higher hardness level than the heats containing essentially no molybdenum, which may be congregated in a band generally having a lower bulk hardness. Further, experimental heats 6 and 11 (containing 13.82 and 13.26 weight percent molybdenum, respectively) showed higher hardness than experimental heats 5 and 10 (containing 7.25 and 7.28 weight percent molybdenum, respectively) in the temperature range from 950° F. to 1500° F.

Multiple linear regression was performed to analyze hardness (HRc) as a function of alloying element content for the results for the 1300° F. tempering condition and the as-hardened (1700° F.) condition. The regression result for the hardened (about 2.5 hours at 1700° F.) and tempered (about 3.5 hours at 1300° F.) condition may be defined by Equation (1):

$$HRc_{t1300} = 148 + 2.66C + 13.6Mn - 3.15Si + 2.74Ni - 0.83Cr - 0.75Mo - 1.38Nb - 1.66Fe \quad \text{Equation (1):}$$

Figure 3:
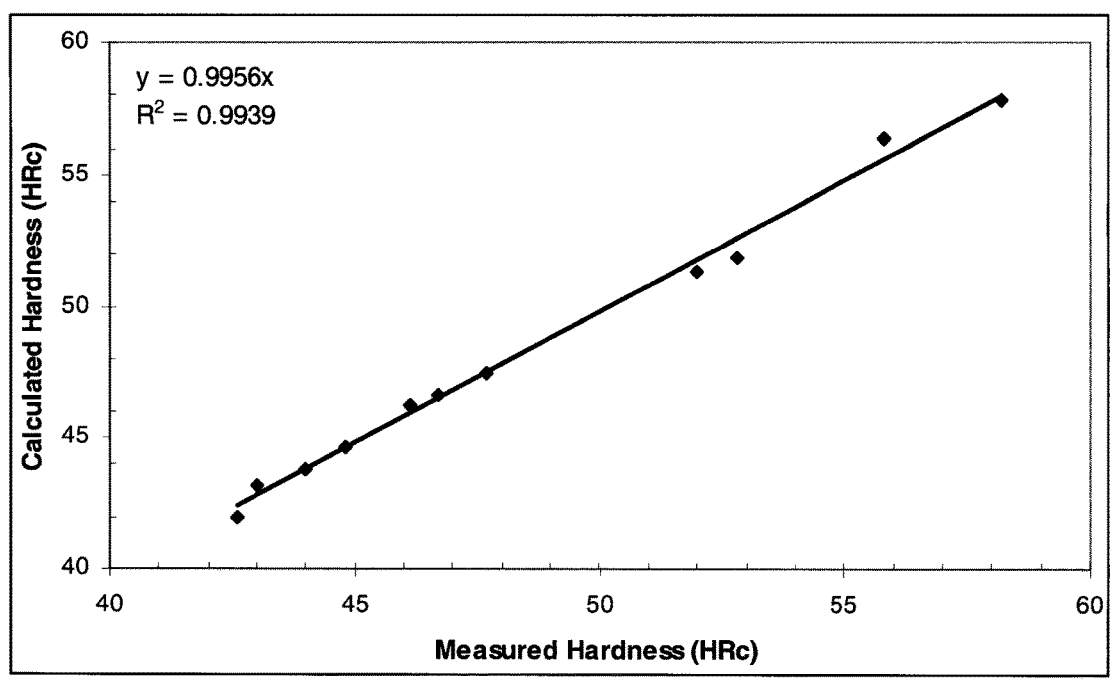
FIG. 3 is a graphical representation of the correlation between a measured and a calculated hardness for the 1300° F. tempering temperature condition for the J513 alloy.

When studying the relative effects of the various elements on bulk HRc, the relative effect of each element is the product of the coefficient and the elemental % content (in weight percent). FIG. 3 illustrates the correlation between the measured and calculated hardness for the 1300° F. tempering temperature condition. As shown in FIG. 3, good correlation between the measured hardness and the calculated hardness using Equation (1) was achieved.

The regression result for the as-hardened at 1700° F. condition (i.e., where the sample was hardened at 1700° F. for about 2.5 hours) can be defined by Equation (2) (where weight percent is applied for all of the alloying elements):

$$HRc_{as-hardened} = 210 - 411.0C - 17.1Mn - 0.56Si + 4.44Ni - 1.63Cr - 1.38Mo - 2.69Nb - 1.79Fe \quad \text{Equation (2):}$$

Figure 4:
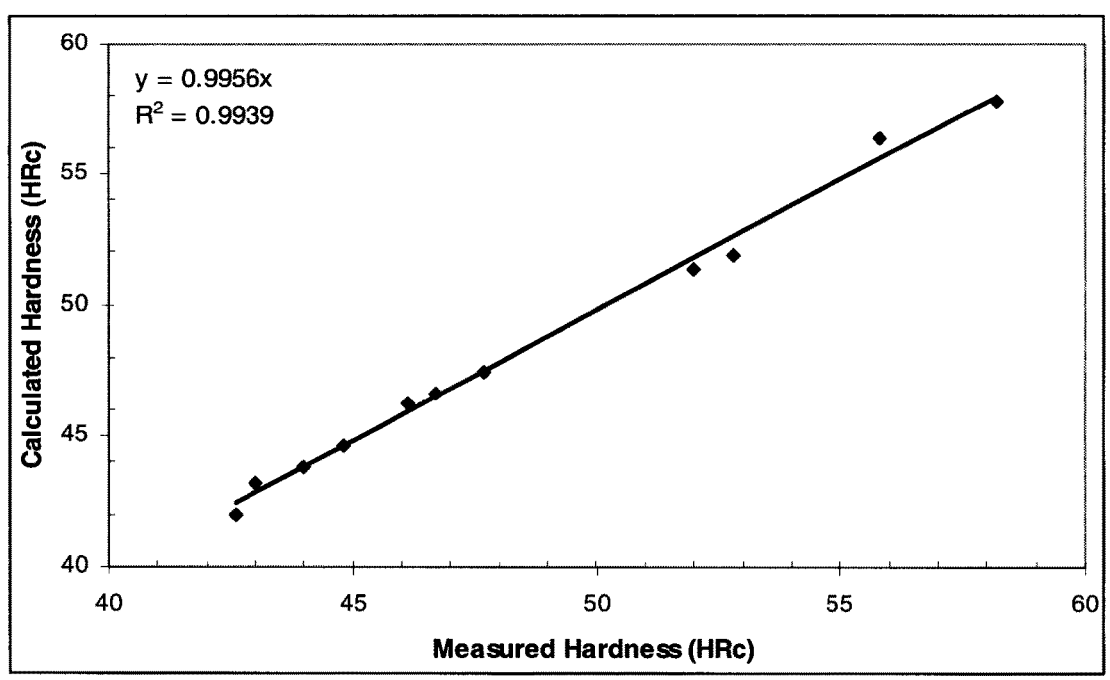
FIG. 4 is a graphical representation of the correlation between a measured and a calculated hardness for the J513 alloy in the as-hardened (1700° F.) condition.

FIG. 4 illustrates the correlation between the measured and calculated hardness for the as-hardened condition at 1700° F. As shown in FIG. 4, good correlation between the measured hardness and the calculated hardness using Equation (2) was achieved.

Figure 5:
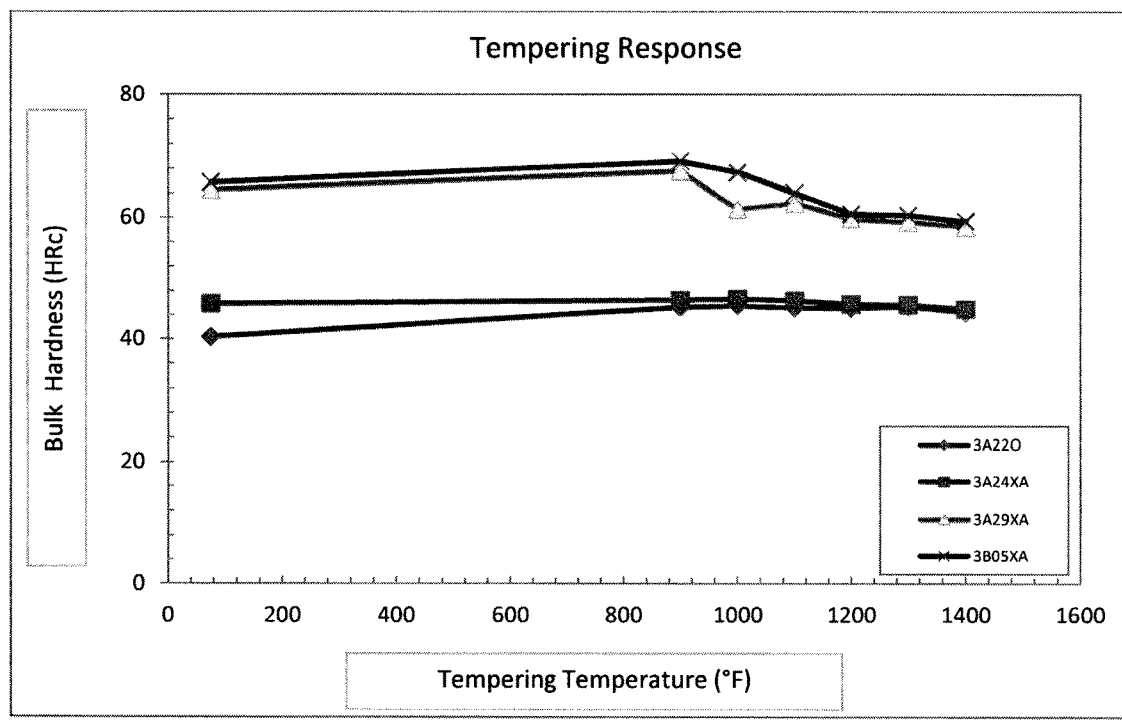
FIG. 5 is a graphical representation of hardness as a function of tempering temperature for experimental heats 12-15.

The tempering response of Experimental Heats 12-15 was also evaluated. The tempering behavior results are illustrated in FIG. 5. Experimental heats 14 and 15 (containing 4.46 and 2.62 weight percent nickel, respectively) showed sustained higher bulk hardness as a function of tempering temperature across the temperature range evaluated (that is, for tempering temperatures from about room temperature through about 1400° F.) as compared to experimental heats 12 and 13 (containing 11.09 and 11.20 weight percent nickel, respectively). Without being bound to any particular theory, it is believed that the lower hardness in heats 12 and 13 was due to the relatively higher nickel concentration of experimental heats 12 and 13. The matrix structures of the alloys of experimental heats 12 and 13 were non-allotropic in nature, and as a result, the bulk hardness in experimental heats 12 and 13 was essentially not affected as a function of tempering temperature (that is, there was no matrix phase transformation).

Example 2: Microstructural Characterization

Experimental heats 6, 7, and 10, which covered high and low chromium and molybdenum ranges (as shown in Table 1), were employed to carry out an alloy microstructural characterization. The microstructural differences between these alloys (in particular between comparative heat 7, as compared to J513 alloy heats 6 and 10) are discussed below. Without being bound to any particular theory, it is believed that the microstructural differences between the compositions are responsible for the difference in bulk hardness under the high tempering temperature condition.

To analyze the microstructure, valve seat insert samples made using experimental heats 6, 7, and 10 were cast, and then exposed to a hardening treatment followed by a tempering treatment. More specifically, the valve seat insert samples were cast and exposed to a hardening treatment at 1700° F. for 2 hours (at temperature), and air-quenched. The samples were at room temperature before proceeding to the tempering step. Samples of the valve seat inserts made with each of experimental heats 6, 7, and 10 were tempered at varying temperatures between 600° F. and 1500° F. for 3 hours (that is to say, samples of the valve seat inserts for each heat were tempered at a given tempering temperature for 3 hours). Specifically, valve seat insert samples were tempered at 1500° F. for 3 hours, or 1300° F. for 3 hours, or 900° F. for 3 hours, or 600° F. for 3 hours.

Comparison of the microstructures of experimental heat 6 (J513) and experimental heat 7 (comparative) clearly shows the substantial metallurgical differences between two heats with different alloying elemental contents. As shown in Table 1, experimental heat 6 is a 21.5Co-17.1Cr-13.8Mo—Fe system, while experimental heat 7 is a 21.5Co-13.3Cr—Fe system. That is to say, experimental heat 6 illustrates the application of a combined composition of chromium and molybdenum for purposes of the alloy system and sigma phase formation analysis, while experimental heat 7 contains less chromium and essentially no molybdenum.

In the as-cast condition, the valve seat insert samples made using experimental heat 6 contained high chromium ferrite and face-centered cubic (FCC) phase, along with a small amount of martensite, with the high chromium ferrite being located in the intradendritic regions, and the FCC phase located in the interdendritic regions. The ratio between the interdendritic region and the intradendritic region was approximately 0.95.

Hardening and tempering treatment under the tested conditions did not significantly change the ratio of the intergranular region to the intragranular region for the alloy of experimental heat 6. Martensitic phase transformation took place in the intradendritic region after hardening treatment (air quenching). In the as-hardened condition, experimental heat 6 possessed approximately 50 vol. % martensitic structures, predominantly in the intracellular region, which was surrounded by network eutectic reaction phases. In addition, after hardening and tempering, significant precipitation of carbides and sigma phases took place in the interdendritic region. The amount of interdendritic precipitation was a function of tempering temperature and heat treatment duration, and tended to be from about 3 to about 15% of the total intergranular regions.

In the as-cast condition, the microstructure of experimental heat 7 differed from that of experimental heat 6. The as-cast microstructure of experimental heat 7 contained a significant amount of martensitic structure, austenite, and network carbides. In the as-hardened condition, almost all of the intragranular regions were martensitic, with network carbides remaining interdendritically. After hardening and tempering treatment, interdendritic carbides could be clearly seen, and a greater tempering effect was obtained as tempering temperature increased. Sigma phase was not detected in the samples made with experimental heat 7.

For the alloy of experimental heat 10, the microstructural morphology in the as-cast condition was similar to that of experimental heat 6. In the as-hardened condition, approximately 85 vol. % of the microstructures were martensitic. The tempered martensitic structures distributed only intragranularly. There was also a significant intragranular area, which was composed of solid solution phase and intermetallic phases.

Comparison of the microstructures of the alloy of experimental heat 6 and that of experimental heat 10 shows the effects of carbon and molybdenum on the alloy system—both systems can be defined as Co—Cr—Mo—Fe systems, and the tempering response in the hardened plus tempered microstructure of experimental heat 10 was similar to that in experimental heat 6. In general, because the alloy of experimental heat 10 contained less molybdenum and less carbon than experimental heat 6 (7.28 weight % molybdenum in experimental heat 10, as compared to 13.82 weight % for experimental heat 6, and 1.395 weight % carbon for experimental heat 10, as compared to 1.595 weight % for experimental heat 6), experimental heat 10 showed a greater tendency to form coarser solidification substructures than experimental heat 6. However, the basic microstructures and microstructural distribution were essentially the same for these alloys.

Example 3: Compression and Tension Testing

Samples of experimental heats 6 (J513 alloy) and 7 (comparative) were evaluated to determine compressive yield strength following ASTM E209-89A (2000) (Standard Practice for Compression Tests of Metallic Materials at Elevated Temperatures with Conventional or Rapid Heating Rates and Strain Rates) at four temperature points up to 1000° F. For comparative purposes, other valve seat insert alloys, including a cobalt-based alloy (J3) and two iron-based alloys (J130 and J160), all available from L.E. Jones Co. of Menominee, Mich., were also evaluated. A comparison of the compressive yield strength as a function of temperature for experimental heat 6 and experimental heat 7 with those of J3, J130, and J160 is set forth in FIG. 6.

Figure 6:
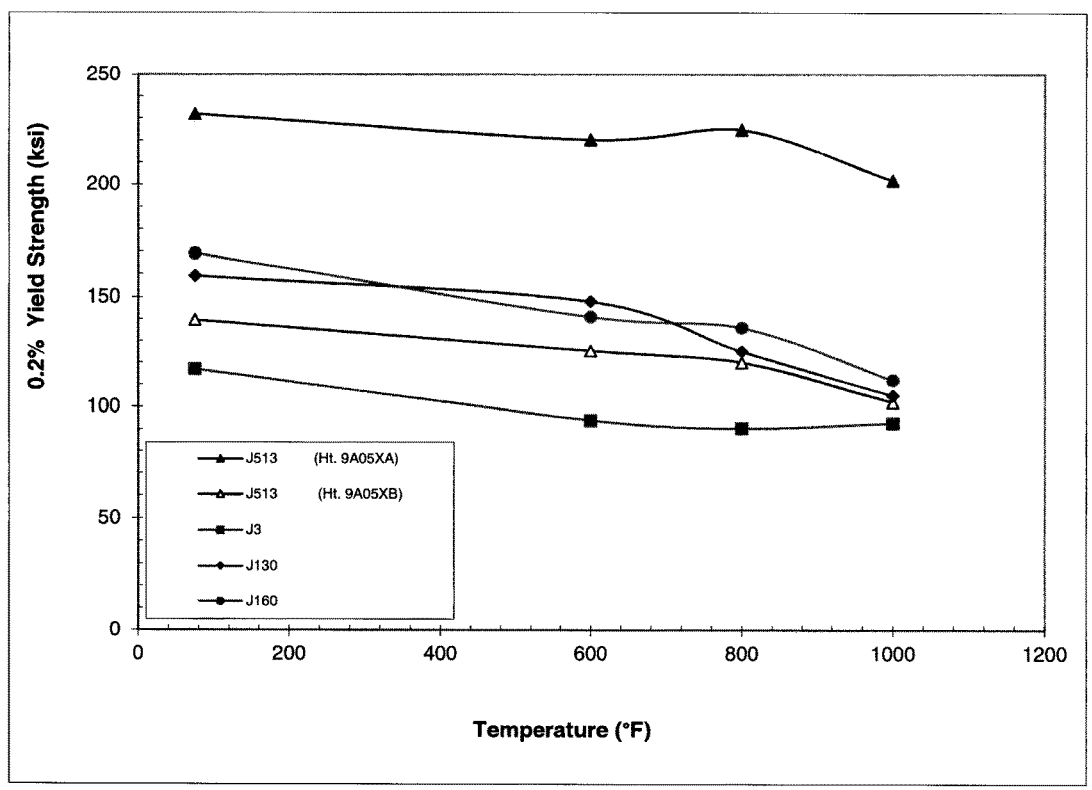
FIG. 6 is a graphical representation of the comparative compressive yield strengths as a function of temperature for the J513 alloy (experimental heat 6), experimental heat 7 (comparative), and the J3, J130, and J160 alloys.

Experimental heat 7, which has a similar microstructure to that of the J130 and J160 alloys, likewise showed a compressive yield strength comparable to that of those alloys. In contrast, as shown in FIG. 6, experimental heat 6 of the J513 alloy exhibited a significantly higher compressive yield strength compared to that of the other alloys. Without being bound to any particular theory, it is believed that the differences in the microstructure of the J513 alloy (such as, for example, intergranular areas comprising solid solution phase and intermetallic phase, with tempered martensitic structures distributed only intragranularly) are a factor in producing the significantly higher compressive yield strength as compared to the other alloys.

A second compressive yield strength analysis was carried out following ASTM E209-89A to evaluate the compressive yield strength of the J513 alloy (experimental heat 20) at six temperature points up to 1200° F., as compared to the J3, J130, and J160 alloys. The results of the compressive yield strength analysis are set forth in Table 4, and illustrated in FIG. 7.

TABLE 4

Compressive Yield Strength as a Function of Temperature
Compression Yield Strength (0.2% YS, ksi)

| Temperature (° F.) | J513 (Ht. 20) | J3 (Ht. 0B03E) | J130 (Ht. 2G03L) | J160 (5G05XA) |
|---|---|---|---|---|
| 75 | 248.5 | 134.6 | 154.0 | 142.6 |
| 600 | 211.1 | 109.4 | 133.1 | 143.8 |
| 800 | 194.9 | 104.9 | 123.3 | 139.7 |
| 1000 | 163.9 | 97.2 | 107.1 | 121.2 |
| 1100 | 115.9 | 97.8 | 79.8 | — |
| 1200 | 74.5 | 94.7 | 62.6 | — |

Figure 7:
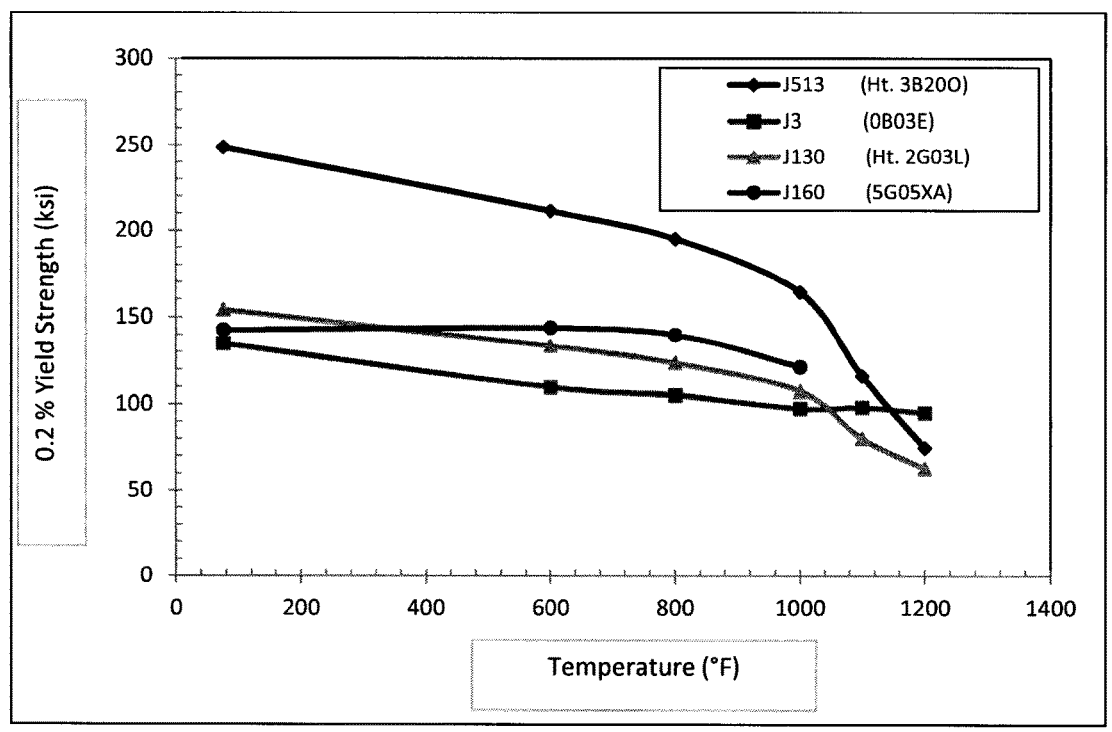
FIG. 7 is a graphical representation of the comparative compressive yield strength as a function of temperature for the J513 alloy as compared to the J3, J130, and J160 alloys.

As shown in Table 4 and in FIG. 7, the J513 alloy showed the highest compressive yield strength among the four VSI alloys studied when the test temperature was at 1100° F. or lower—that is to say, the J3, J130, and J160 alloys each exhibited approximately the same level of compressive yield strength, while the compressive yield strength of the J513 alloy was on a significantly higher level, much higher than that of commercial alloys.

These studies indicate that the J513 alloy can achieve greater high temperature strength and hot hardness than classical iron-based VSI materials, and could therefore find utility in applications with extremely high engine combustion temperature and working stress.

Figure 8:
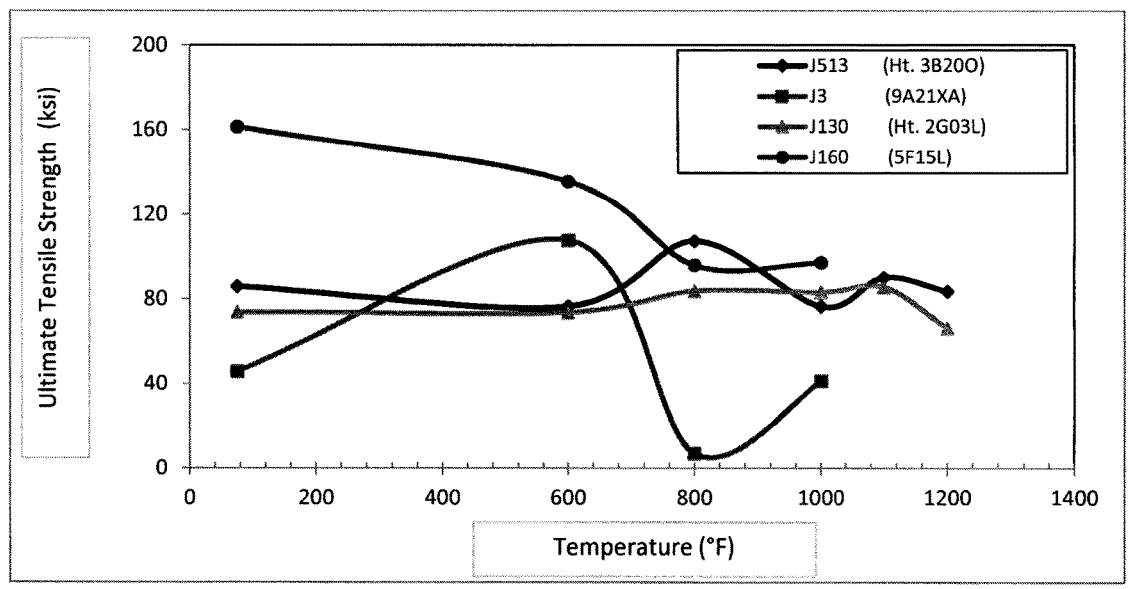
FIG. 8 is a graphical representation of the ultimate tensile strength as a function of temperature for the J513 alloy (as compared to that of the J3, J130, and J160 alloys).

The J513 alloy (experimental heat 20) was also evaluated for tensile strength for temperatures up to 1200° F. using ASTM E8-04 (2004) (Standard Test Methods for Tension Testing of Metallic Materials) and ASTM E21-05 (Standard Test for Ultimate Tensile Rupture Strength). The results of this testing are summarized in Table 5, and illustrated in FIG. 8.

TABLE 5

Ultimate Tensile Strength (UTS) as a Function of Temperature

| | UTS (ksi) | | | |
|---|---|---|---|---|
| Temperature (° F.) | J513 (Heat 20) | J3 (9A21XA) | J130 (2G03L) | J160 (5F15L) |
| 75 | 85.7 | 45.8 | 73.8 | 161.2 |
| 600 | 76.4 | 107.5 | 73.6 | 135.3 |
| 800 | 107.1 | 6.9 | 83.5 | 95.7 |
| 1000 | 76.3 | 41.2 | 82.9 | 96.9 |
| 1100 | 89.9 | — | 85.3 | — |
| 1200 | 83.3 | — | 66.3 | — |

As shown above and illustrated in FIG. 8, the J513 alloy exhibited an overall equivalent or slightly higher ultimate tensile strength compared to the J130 alloy.

Example 4: Composition Fine-Tuning

The effects of compositional changes were further explored by fine-tuning the composition of the J513 alloy in five additional experimental heats. The compositions of experimental heats 25-29 are set forth below in Table 6. Properties of the J513 alloy are discussed below.

Figure 9:
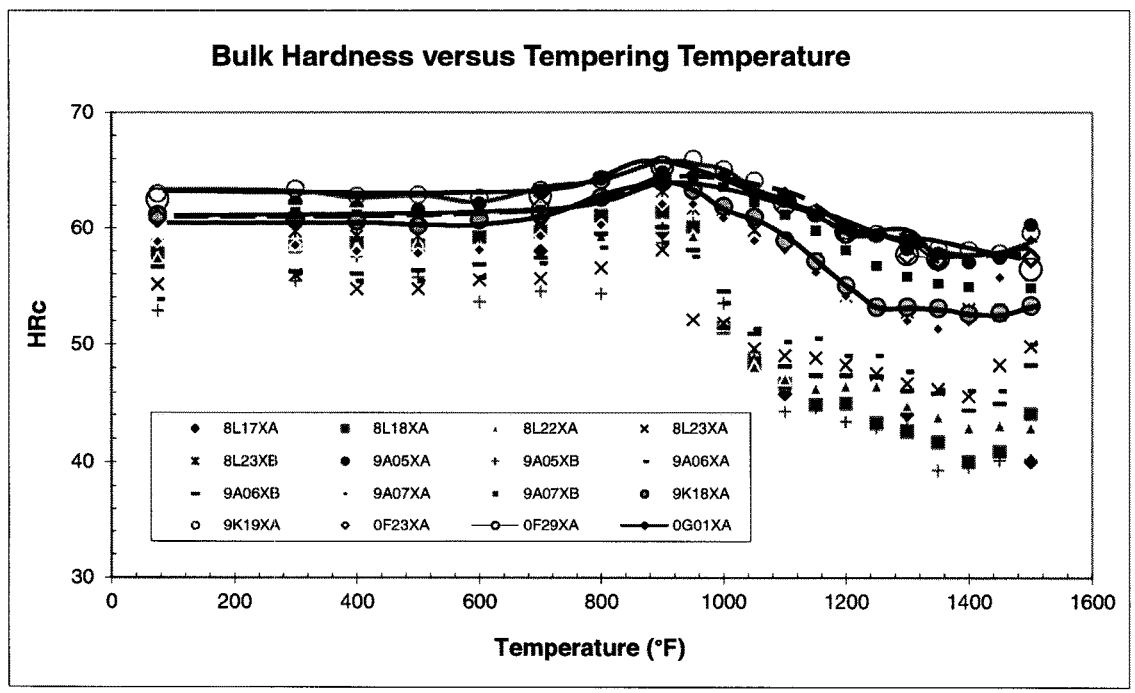
FIG. 9 is a graphical representation of the bulk hardness as a function of tempering temperature for Experimental Heats 25-29, as compared to Experimental Heats 1-11.

The bulk hardness as a function of tempering temperature was evaluated for experimental heats 25-29. FIG. 9 presents the results of this analysis, superimposed on the results obtained from heats 1-11. All five experimental heats (i.e., experimental heats 25-29) were within the higher hardness level band for the tempering temperature ranging from 900° F. to 1500° F. Within the tempering range up to 1500° F., the minimum hardness was found in experimental heat 25 (specifically, HRc 53).

Iron-based martensitic matrix alloys have been applied for modern heavy duty engine valve seat insert applications, but the bulk hardness of commonly-available iron-based martensitic matrix alloys sharply decreases when the tempering temperature is around 1000° F. The hardness reduction at elevated temperature is principally a diffusion controlled process. A gradual reduction in hardness would be expected if these materials are heated to a very high temperature.

The J513 alloy presents an iron-rich alloy system that can exhibit a sustained hardness behavior in a higher temperature range, such as from about 900° F. to about 1500° F., for engine valve train applications. The above results demonstrate that the J513 alloy exhibits a hot hardness level in an elevated temperature range (900° F. through 1500° F.) suitable for satisfactory performance in a modern internal combustion engine.

Example 5: Hot Hardness

Two samples of the J513 alloy (experimental heats 25 and 26) were evaluated for hot hardness at temperatures up to

TABLE 6

Experimental Heats Employed for Alloy System Fine-Tuning

| Heat | | C | Mn | Si | Ni | Cr | Mo | Co | Nb | W | V | Fe | N | P | S | Ratio Cr/Mo |
|---|---|---|---|---|---|---|---|---|---|---|---|---|---|---|---|---|
| 9K18XA | 25 | 1.589 | 0.390 | 0.710 | 0.100 | 13.179 | 8.611 | 21.48 | 0.2 | 0.043 | 0.045 | 51.20 | 0.196 | 0.021 | 0.011 | 1.53 |
| 9K19XA | 26 | 1.797 | 0.390 | 0.025 | 0.032 | 16.130 | 12.820 | 21.48 | 0.1 | 0.042 | 0.030 | 43.90 | 0.145 | 0.022 | 0.010 | 1.26 |
| 0F23XA | 27 | 1.458 | 0.273 | 0.282 | 0.040 | 16.896 | 13.487 | 21.48 | 0.6 | 0.047 | 0.035 | 41.70 | 0.146 | 0.020 | 0.010 | 1.25 |
| 0F29XA | 28 | 1.681 | 0.269 | 0.290 | 0.026 | 17.652 | 12.859 | 21.48 | 0.6 | 0.041 | 0.031 | 41.35 | 0.157 | 0.019 | 0.010 | 1.37 |
| 0G01XA | 29 | 1.561 | 0.332 | 0.340 | 0.046 | 19.164 | 11.475 | 21.48 | 0.6 | 0.044 | 0.031 | 41.06 | 0.175 | 0.019 | 0.012 | 1.67 |

Experimental heats 25 and 26 explored the combination effect of chromium and molybdenum content along with carbon content on the bulk hardness. Experimental heats 27, 28, and 29 studied the effect of the chromium to molybdenum ratio on a material's metallurgical and mechanical properties.

1600° F. with the Vickers hardness testing technique (accordingly, the hot hardness closely reflected the effect of hard phases existing in an alloy). For comparative purposes, other iron-based alloys available from L.E. Jones including J130 (an iron-based alloy) and J153 (an iron-chromium alloy) were also tested for hot hardness. The composition of the alloys used in this study is set forth in Table 7.

TABLE 7

Experimental Heats Employed for Hot Hardness Testing

| | Heat Number | C | Mn | Si | Ni | Cr | Mo | Co | Nb | W | V | Fe | N | P | S |
|---|---|---|---|---|---|---|---|---|---|---|---|---|---|---|---|
| J513 (Heat 25) | 9K18XA | 1.589 | 0.390 | 0.710 | 0.100 | 13.179 | 8.611 | 21.48 | 0.2 | 0.043 | 0.045 | 51.20 | 0.196 | 0.021 | 0.011 |
| J513 (Heat 26) | 9K19XA | 1.797 | 0.390 | 0.025 | 0.032 | 16.130 | 12.820 | 21.48 | 0.1 | 0.042 | 0.030 | 43.90 | 0.145 | 0.022 | 0.010 |
| J130 | 1L18L | 1.679 | 0.494 | 1.118 | 1.175 | 9.73 | 9.43 | — | 2.1 | — | 1.326 | 72.44 | — | 0.020 | 0.012 |
| J153 | 8G24XA | 1.984 | 0.295 | 2.004 | 1.644 | 31.21 | 1.958 | — | 3.2 | 1.233 | — | 55.85 | — | 0.009 | 0.008 |
| J153 | 9L16A | 2.032 | 0.449 | 2.140 | 1.932 | 32.47 | 1.856 | — | 3.6 | 1.516 | — | 53.11 | — | 0.014 | 0.006 |

Figure 10:
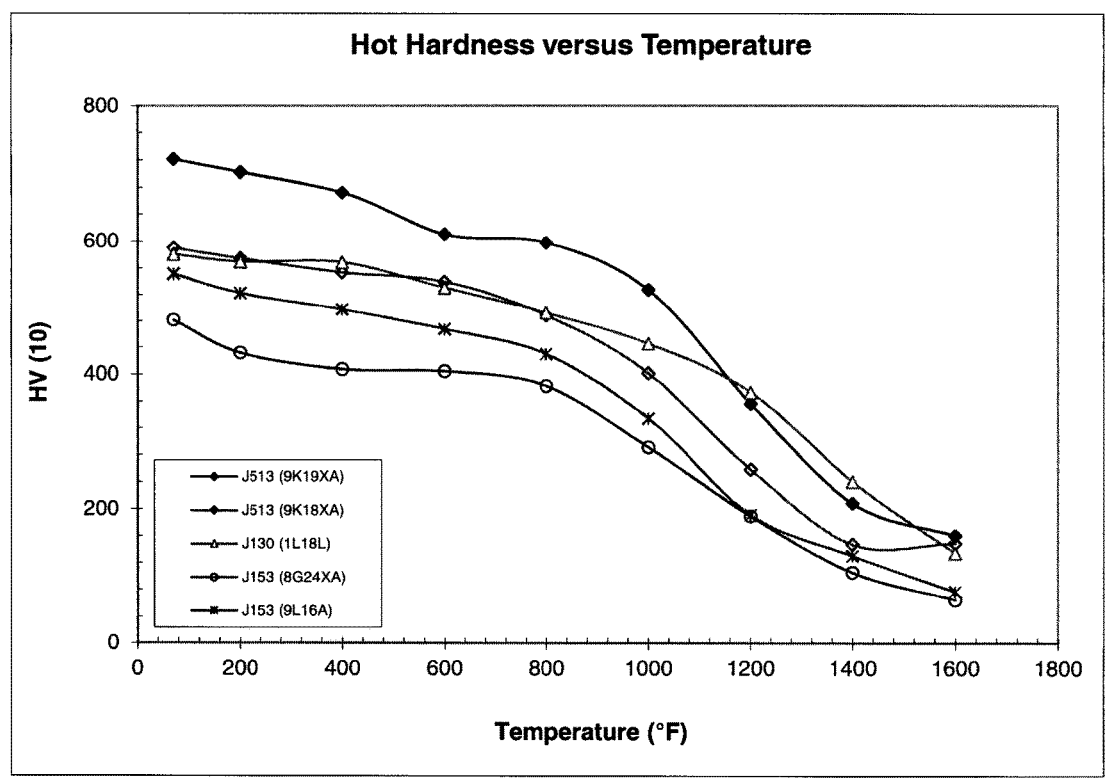
FIG. 10 is a graphical representation of the hot hardness vs. temperature behavior of the J513 alloy (experimental heats 25 and 26) as compared to the J130 and J153 alloys.

FIG. 10 compares the hot hardness vs. temperature behavior of the analyzed alloys. As shown in FIG. 10, experimental heat 26 of the J513 alloy, which had a higher chromium (16.13 weight percent) and molybdenum (12.82 weight percent) content than experimental heat 25 of the J513 alloy, had the highest overall hot hardness among the alloys studied. At 1600° F., both J513 heats showed a hot hardness equivalent to the J130 alloy. This is mostly likely related to the matrix strengthening mechanisms in the J513 alloy, which were different from that of J130. Sigma phase formation in the J513 alloy proceeded at a significantly higher rate at 1500° F. than at a temperature lower than 1500° F.

Example 6: Castability and Machinability Evaluation

A preliminary castability and machinability evaluation was carried out with two production furnace heats (experimental heats 30 and 31). The composition of these two experimental heats is summarized in Table 8.

TABLE 8

Experimental Heats Employed for Castability and Machinability Evaluation

| Heat | | C | Mn | Si | Cr | Mo | Co | Fe | N | P | S | Nb | W | Ni |
|---|---|---|---|---|---|---|---|---|---|---|---|---|---|---|
| 30 | 0K02Y | 1.400 | 0.388 | 0.388 | 16.85 | 13.88 | 21.31 | 44.72 | 0.213 | 0.046 | 0.018 | 0.0265 | 0.0834 | 0.0345 |
| 31 | 0L15M | 1.550 | 0.296 | 0.334 | 17.15 | 13.67 | 20.75 | 45.16 | 0.229 | 0.047 | 0.017 | <0.004 | 0.0863 | 0.0487 |

Thermal Expansion and Contraction Behavior

Samples made with experimental heat 31 were used for studying J513 thermal expansion and contraction behavior. All tests were performed in an argon atmosphere. The test was performed twice, and each test exhibited essentially identical thermal expansion and contraction behavior.

Figure 11:
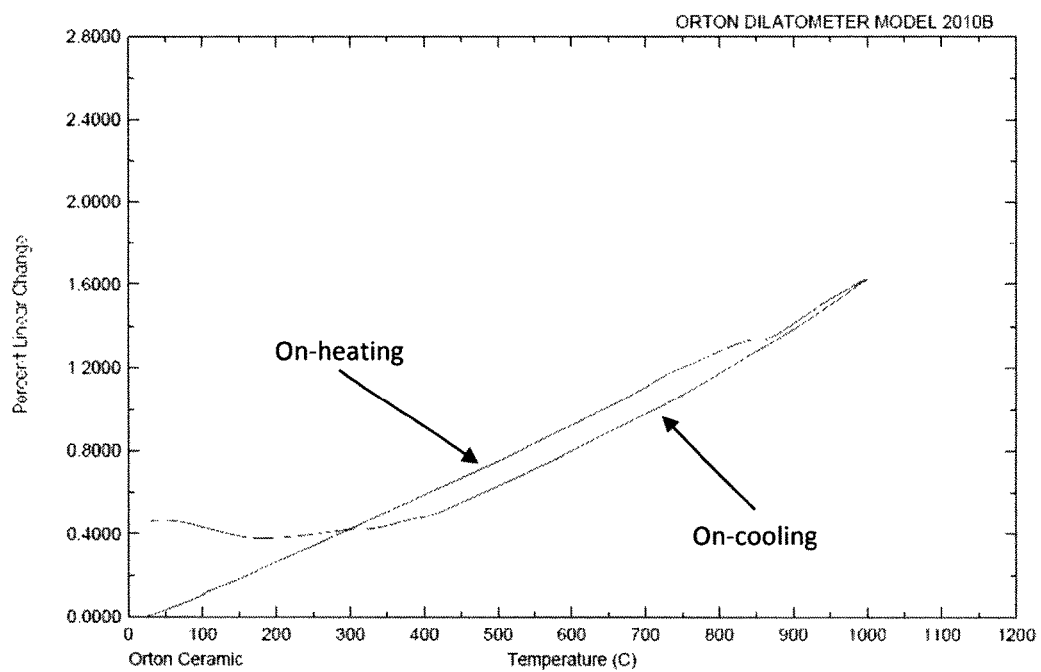
FIG. 11 is a graphical representation of the linear thermal expansion/contraction behavior of the J513 alloy in the as-cast condition for the first thermal expansion analysis.
Figure 12:
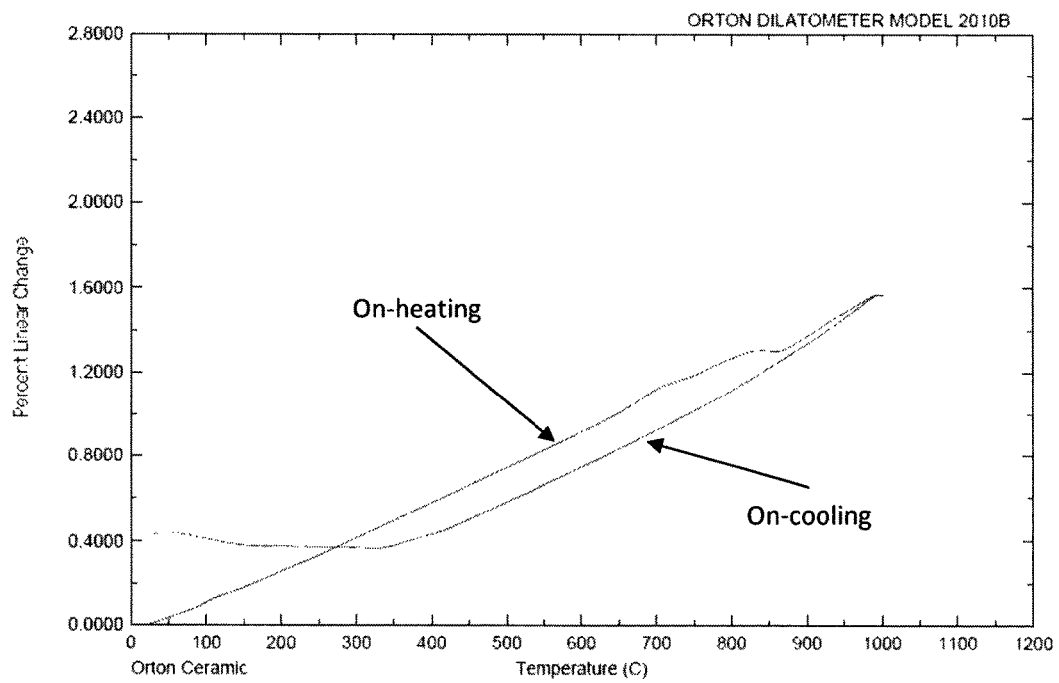
FIG. 12 is a graphical representation of the linear thermal expansion/contraction behavior of the J513 alloy in the as-cast condition for the second thermal expansion analysis.

FIGS. 11 and 12 present the linear thermal expansion/contraction behavior of J513 in the as-cast condition for the first and second test runs, respectively. The evaluation showed that the austenitizing temperature of the J513 alloy was approximately 830° C., and that the martensitic transformation temperature was greater than about 335° C. Accordingly, it was determined that the J513 alloy possesses a high hardenability and is suitable for air quenching.

Figure 13:
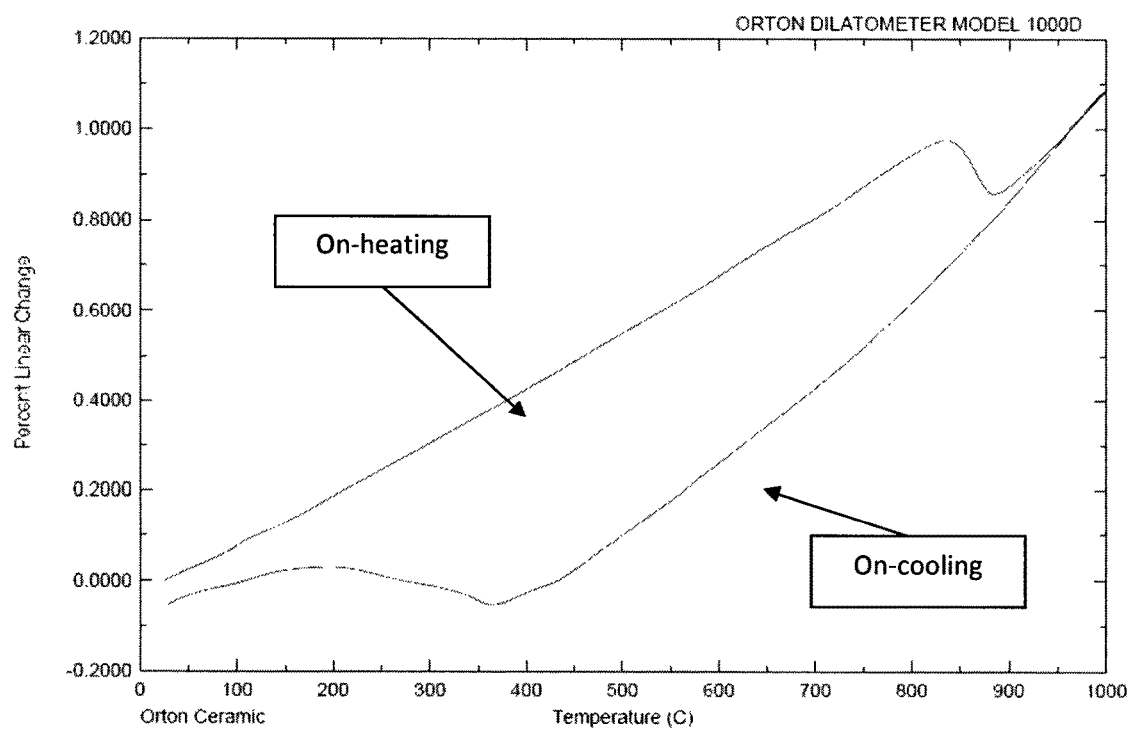
FIG. 13 is a graphical representation of the linear thermal expansion/contraction behavior of the J513 alloy in the hardened (927° C.) plus tempered (732° C.) condition.

FIG. 13 presents the linear thermal expansion/contraction behavior of the J513 alloy with a hardened (927° C.) plus tempered (732° C.) condition. The austenite and martensite starting and finishing temperatures can be readily determined using the dilitometry results presented in FIG. 13. Typical thermal expansion coefficients at the tested temperature range are presented in Table 9. The results indicated that the thermal expansion property of the J513 alloy was suitable for valve seat insert applications.

TABLE 9

Linear Thermal Expansion Coefficient

| Temperature | | CTE ×10⁻⁶ | CTE ×10⁻⁶ |
|---|---|---|---|
| ° C. | ° F. | (mm/mm ° C.) | (mm/mm ° F.) |
| 25-200 | 77-392 | 10.68 | 5.93 |
| 25-300 | 77-572 | 11.02 | 6.12 |
| 25-400 | 77-752 | 11.31 | 6.28 |
| 25-500 | 77-932 | 11.54 | 6.41 |
| 25-600 | 77-1112 | 11.73 | 6.52 |
| 25-700 | 77-1292 | 11.90 | 6.61 |
| 25-800 | 77-1472 | 12.15 | 6.75 |

Example 7: Corrosion Resistance Testing

Samples of the J513 alloy (experimental heat 22) were evaluated for corrosion resistance using ASTM G31-72 (Reapproved 2004) (Standard Practice for Laboratory Immersion Corrosion Testing of Metals). A standard sample size was applied (1" length, 0.6" width, 0.25" thickness, and a small specimen hanging hole 0.145" in diameter). Specimen weight was determined before starting the test and during the test after 1 hour, 10 hours, and 100 hours.

The acidified test solution was composed of sodium sulfate (7800 ppm $SO_4^{2-}$) and sodium nitrate (1800 ppm $NO_3^-$). The pH of the solution was adjusted to 2.8. For comparative purposes, other valve seat insert alloys, including J109 (a super austenitic VSI alloy), J130, and J153 (a high chromium ferrite/carbide alloy), were also evaluated for corrosion resistance. All of the J-series alloys are available from L. E. Jones Company, located in Menominee, Mich.

Figure 14:
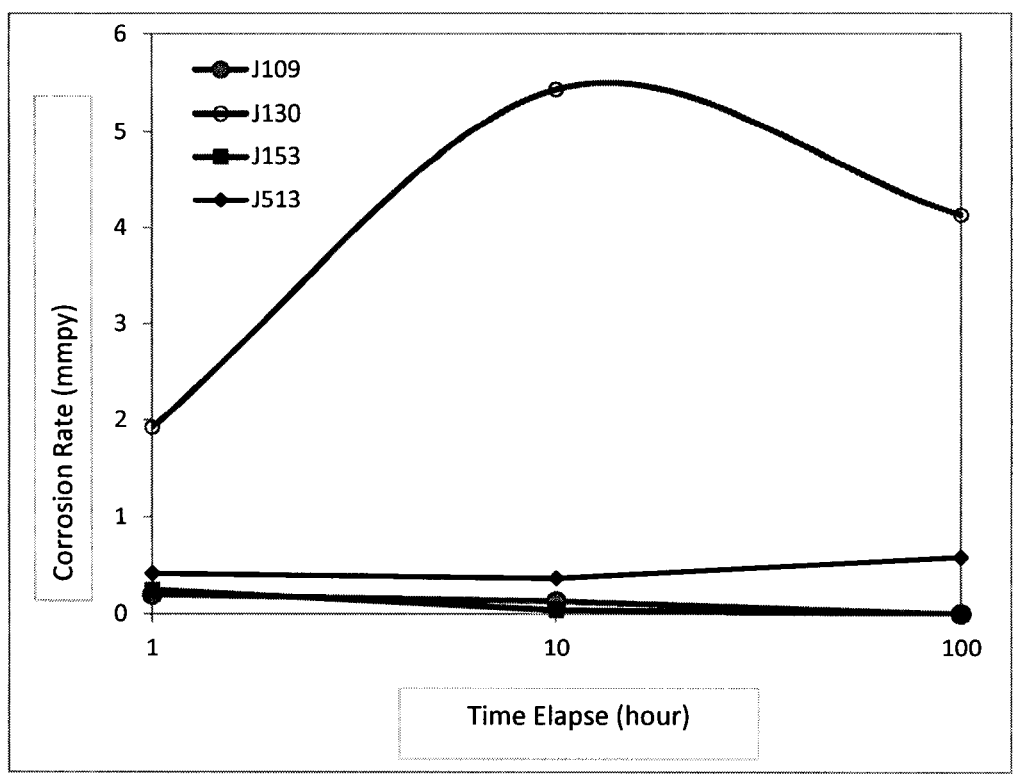
FIG. 14 is a graphical representation of the corrosion rate over testing time of the J513 alloy, as compared to the J109, J130, and J153 alloys.

FIG. 14 summarizes the results of the corrosion test for the J513, J109, J130, and J153 alloys. Compared to super austenitic VSI alloy J109 and high chromium ferrite/carbide alloy J153, J513 showed only a slightly higher corrosion rate. Compared to alloy J130, J513 showed a significantly lower corrosion rate.

Example 8: Dimensional Stability Testing

Samples of the J513 alloy were evaluated for crystallographic stability by measuring the dimensional changes of the sample valve seat inserts before and after exposure to an elevated temperature. The valve seat inserts were heated to about 1200° F. (about 650° C.) for 20 hours. To eliminate oxidation on the surfaces of the valve seat insert samples, all samples were enclosed in a stainless steel envelope during heating.

The outer diameters ("OD") of the VSI samples were measured at two locations, spaced 180° apart, both before and after thermal treatment. The difference between the OD size before and after heat treatment was used to define the VSI dimensional stability. Four different VSI geometries were used for the VSI dimensional stability investigation, representing four different VSI outer diameters, inner diameters ("ID"), height, and seat angle dimensional parameters. The dimensional measurements for the four different valve seat insert geometries are summarized in Table 10. Other VSI dimensional parameters had an influence on the OD dimensional change—that is, the dimensional stability was not related only to the VSI material but also to sample geometry (e.g., seat angle, seat height, and so forth). However, the material was generally the primary factor affecting VSI dimensional stability.

TABLE 10

Summary of VSI Dimensional Stability Test

| Specimen | Heat 20; Sample X2265561J513 | Heat 21; Sample X2206850J513 | Heat 22; Sample X2884750J513 | Heat 20; Sample X3679659J513 |
|---|---|---|---|---|
| Pre-thermal Exposure OD Size (in) | 1.68719 | 1.73565 | 1.75575 | 1.87411 |
| Post-thermal Exposure OD Size (in) | 1.68656 | 1.73569 | 1.75528 | 1.87451 |
| OD Dimensional Change (in) | 0.00059 | 0.00040 | 0.00047 | 0.0004 |
| Dimensional Changing Rate (in/in) | $3.498 \times 10^{-4}$ | $2.304 \times 10^{-4}$ | $2.676 \times 10^{-4}$ | $2.134 \times 10^{-4}$ |

Valve seat insert dimensional stability is important for VSI applications—for example, good VSI dimensional stability can contribute to a better valve train performance and ensure a good VSI retention capability. As shown in Table 10, the parts evaluated in the dimensional stability test showed a small positive gain in the OD size after the dimensional stability treatment. The rates of dimensional change for these samples were considered to be well within an acceptable range. Accordingly, the J513 alloy possessed a good dimensional retention capability.

Example 9: SEM/EDS Assisted Microstructural Characterization

Figure 15:
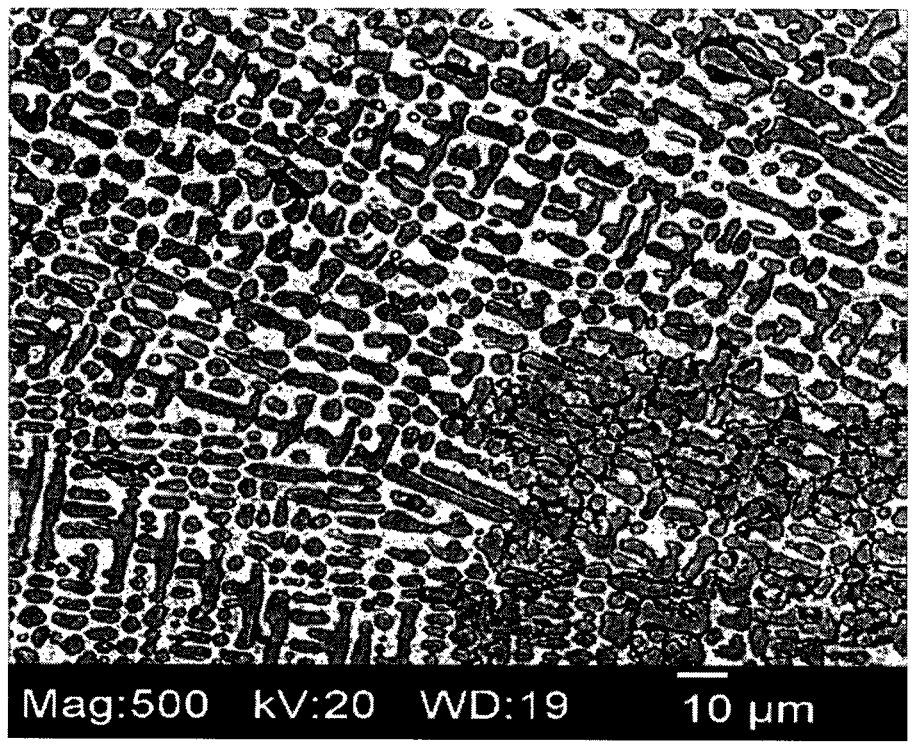
FIG. 15 is a scanning electron microscopy (SEM) micrograph depicting a backscattered electron image of the J513 microstructure in the as-cast condition.

FIG. 15 is a scanning electron microscopy (SEM) micrograph illustrating a backscattered electron image of the J513 microstructure (experimental heat 6) in the as-cast condition. As shown in FIG. 15, the J513 alloy has solidification substructures exhibiting two uniformly distributed constituencies. During the casting process, the intradendritic regions (darker areas) solidify first and reject extra alloying elements such as chromium and molybdenum into the neighboring liquid. When the solidification process takes place in the interdendritic areas (brighter areas), a higher than average elemental concentration of chromium and molybdenum is present.

Each of the features was further characterized by energy dispersive x-ray spectroscopy (EDS) to semi-quantitatively define the composition of each region. The results of the EDS analysis are summarized in Table 11.

TABLE 11

EDS Analysis Results from Interdendritic and Intradendritic Regions in Weight Percent

| Location | Element | Area 1 | Area 2 | Area 3 | Average |
|---|---|---|---|---|---|
| Intradendritic | Fe | 54.07 | 49.59 | 52.07 | 51.91 |
|  | Co | 24.64 | 22.38 | 24.60 | 23.87 |
|  | Cr | 14.14 | 17.43 | 14.9 | 15.49 |
|  | Mo | 7.16 | 10.27 | 7.72 | 8.38 |
| Interdendritic | Fe | 36.19 | 34.25 | 30.51 | 33.62 |
|  | Co | 14.64 | 13.84 | 12.80 | 13.76 |
|  | Cr | 23.25 | 24.52 | 26.84 | 24.87 |
|  | Mo | 25.92 | 26.91 | 29.44 | 27.42 |

The EDS analysis results reveal that, as compared to the intradendritic areas, the interdendritic areas were rich in chromium and molybdenum but depleted in iron and cobalt. Carbon, silicon, boron, tungsten, and nickel also existed in the J513 both interdendritically and intradendritically, but the amount of these elements was significantly smaller. The content of iron, chromium, molybdenum, and cobalt was significantly higher, and these elements were thus treated as alloy system elements.

The intradendritic areas in the J513 alloy may be treated as iron-based domains with substantially high hardenability and a tendency to form the intermetallic phase. Accordingly, in these intradendritic areas, martensitic microstructure can form under a hardening treatment. During tempering, carbide precipitation can take place from the martensitic microstructure. Additionally, intermetallic phases (such as Laves phase) can form in the interdendritic regions. The amount and distribution of the intermetallic phase in the interdendritic regions is a function of thermal treatment conditions.

The interdendritic regions in the J513 alloy may be treated as a multiple elemental alloy system in which sigma phase can be formed. The SEM/EDS-assisted analysis reveals that there was very high potential to form sigma phase in the interdendritic areas. For example, the alloy may contain from about 3 to about 9 volume percent sigma phase.

Figure 16A:
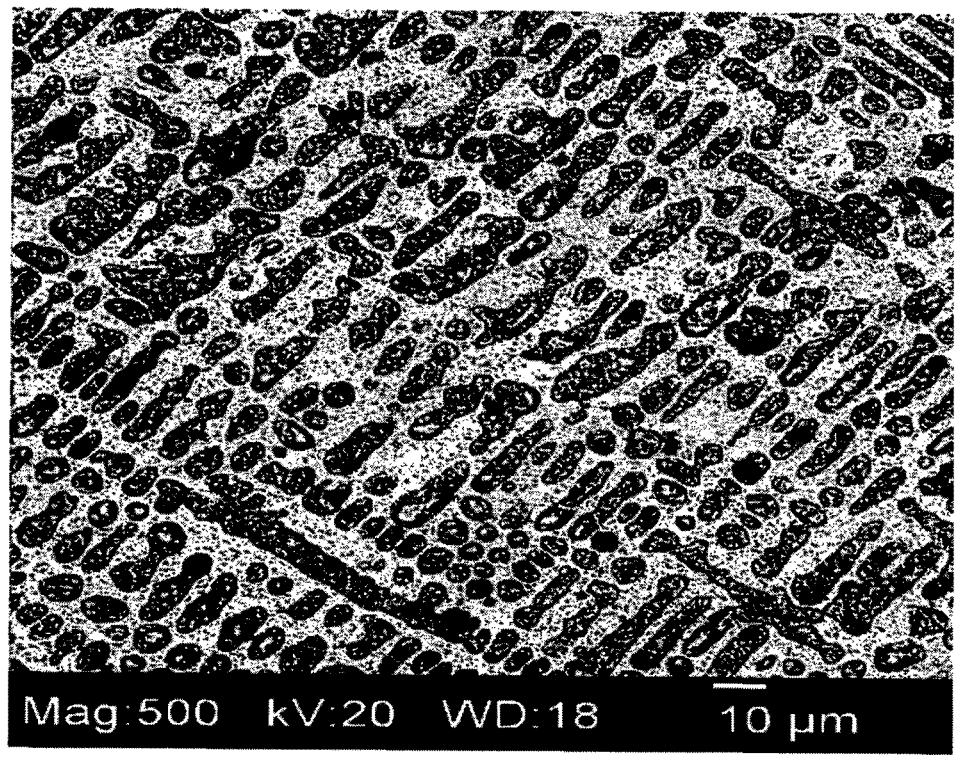
FIGS. 16A and 16B are SEM micrographs showing a backscattered electron image of the J513 microstructure heat treated at 1500° F. for 4 hours.
Figure 16B:
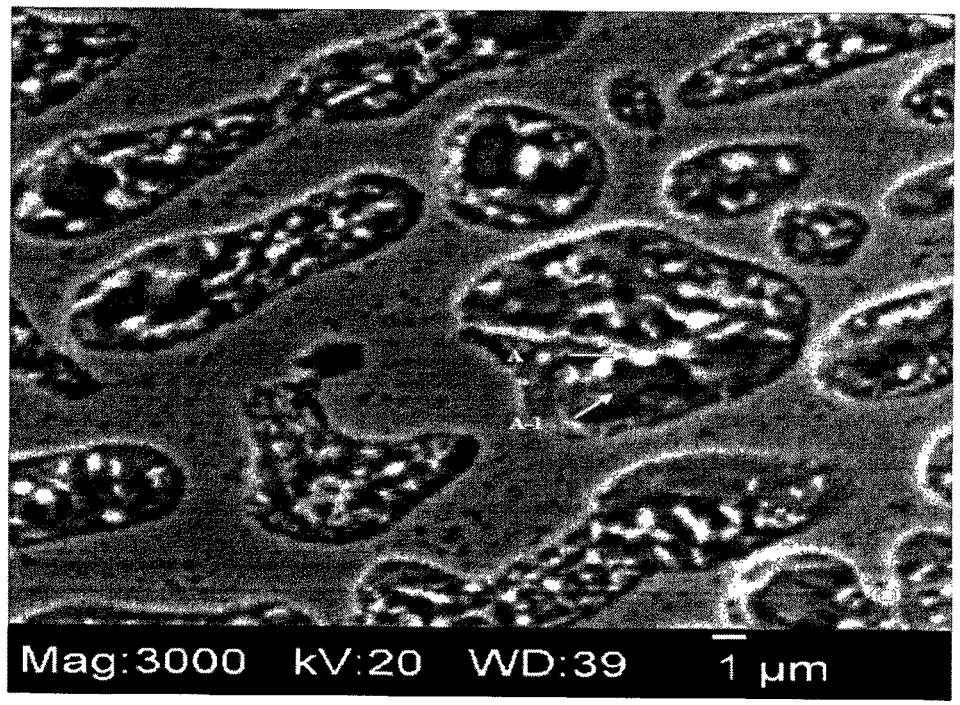

FIG. 16 is an SEM micrograph illustrating a backscattered electron image of the J513 microstructure (experimental heat 6) heat treated at 1500° F. for 4 hours (FIG. 16B presents an enlarged view of the backscattered electron image of FIG. 16A). Compared to the as-cast microstructure illustrated in FIG. 15, the heat-treated samples contained a significant amount of precipitations. Typical precipitations in the intradendritic regions were brighter—accordingly, these precipitations were likely rich in cobalt and molybdenum. The precipitations in the interdendritic regions were regions were darker and thus were likely rich in iron and chromium. Sigma phase was expected to form interdendritically, and Laves phase was anticipated to form intradendritically.

An EDS analysis of the locations marked in the enlarged SEM image shown in FIG. 16B was conducted. The results of the EDS analysis for the precipitation and "matrix" phase in the intradendritic regions are summarized in Table 12.

TABLE 12

EDS Analysis Results of Precipitates and "Matrix" of Intradendritic Regions (in Weight Percent)

| Location | Element | Area 1 | Area 2 | Area 3 | Average |
|---|---|---|---|---|---|
| Intradendritic Precipitate | Fe | 50.23 | 47.88 | 52.42 | 50.18 |
|  | Co | 17.06 | 15.75 | 18.87 | 17.23 |
|  | Cr | 18.05 | 19.23 | 17.04 | 18.11 |
|  | Mo | 13.42 | 16.44 | 11.24 | 13.70 |

TABLE 12-continued

EDS Analysis Results of Precipitates and "Matrix" of Intradendritic Regions (in Weight Percent)

| Location | Element | Area 1 | Area 2 | Area 3 | Average |
|---|---|---|---|---|---|
| Intradendritic "matrix" | Fe | 59.23 | 58.04 | 59.85 | 59.04 |
| | Co | 21.20 | 19.81 | 20.69 | 20.57 |
| | Cr | 14.39 | 15.22 | 13.61 | 14.41 |
| | Mo | 5.02 | 6.50 | 5.39 | 5.64 |

The results from the precipitates and the "matrices" may have been somewhat influenced by each other because the size of each region was close to or smaller than the electron beam diameter. However, the repeatability of the EDS analysis results from different precipitates and "matrices" indicated that a molybdenum-rich type of precipitates (such as Laves phase) was most likely present. In addition, the dark spots in the intradendritic regions were most likely chromium carbides.

The dark precipitates in the interdendritic regions were most likely sigma phases. The unique fine distribution of the interdendritic and intradendritic constituents provided a well-suited precondition for formation of Laves phase, carbides, and sigma phase, and uniform distribution under a thermal treatment condition. With the desired matrix strengthening phases and microstructural distribution, the presence of sigma phase did not significantly reduce the alloy toughness, even with high bulk hardness.

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

What is claimed is:

1. An iron-based alloy comprising, in weight percent:
carbon from about 1 to about 2 percent;
manganese up to about 1 percent;
silicon up to about 1 percent;
nickel up to about 4 percent;
chromium from about 10 to about 25 percent;
molybdenum from about 5 to about 20 percent;
tungsten up to about 4 percent;
cobalt from about 17 to about 23 percent;
vanadium up to about 1.5 percent;
boron up to about 0.2 percent;
sulfur up to about 0.03 percent;
nitrogen from about 0.1 to about 0.4 percent;
phosphorus up to about 0.06 percent;
niobium up to about 4 percent;
iron from about 35 to about 55 percent; and
incidental impurities;
wherein the chromium/molybdenum ratio of the iron-based alloy is from about 1.2 to about 2.5, the total chromium plus molybdenum content is 20 to 35 percent, the alloy has an as-cast microstructure consisting essentially of uniformly distributed intradendritic regions and interdendritic regions with a ratio of the interdendritic regions to the intradendritic regions of from about 40:60 to about 60:40.

2. The iron-based alloy of claim 1, wherein the iron-based alloy consists essentially of, in weight percent:
carbon from about 1.4 to about 1.9 percent;
manganese up to about 1 percent;
silicon up to about 1 percent;
nickel up to about 1 percent;
chromium from about 13 to about 19 percent;
molybdenum from about 8 to about 14 percent;
tungsten up to about 1 percent;
cobalt from about 19 to about 22 percent;
vanadium up to about 0.5 percent;
niobium up to about 1 percent;
nitrogen from about 0.1 to about 0.4 percent;
phosphorus up to about 0.06 percent;
sulfur up to about 0.03 percent;
boron up to about 0.2 percent;
iron from about 38 to about 51 percent; and
incidental impurities, wherein the ratio of the interdendritic regions to the intradendritic regions is from about 44:55 to about 55:45.

3. An iron-based alloy comprising, in weight percent:
carbon from about 1.6 to about 1.9 percent;
manganese from about 0.15 to about 0.35 percent;
silicon from about 0.2 to about 0.6 percent;
nickel from about 0.8 to about 4 percent;
chromium from about 14 to about 16 percent;
molybdenum from about 12 to about 14 percent;
tungsten up to about 3 percent;
cobalt from about 19 to about 21 percent;
vanadium up to about 0.5 percent;
nitrogen from about 0.1 to about 0.4 percent;
boron up to about 0.2 weight percent;
iron from about 38 to about 51 percent; and
incidental impurities:
wherein the chromium/molybdenum ratio of the iron-based alloy is from about 1 to about 2.5.

4. The iron-based alloy according to claim 1, wherein the sum of the chromium content and the molybdenum content is from about 25 to about 35 weight percent.

5. The iron-based alloy of claim 1, wherein the molybdenum content is from about 7 to about 15 weight percent, and the chromium content is from about 12 to about 20 weight percent.

6. The iron-based alloy of claim 1, wherein the chromium/molybdenum ratio is from about 1.25 to about 1.35.

7. The iron-based alloy of claim 1, wherein the iron-based alloy comprises, in weight percent:
niobium from about 0.1 to about 0.2 percent;
tungsten up to about 0.25 percent;
vanadium from about 0.01 to about 0.05 percent;
nitrogen from about 0.1 to about 0.25 percent;
nickel up to about 0.6 percent; and
chromium from about 13 to about 19 percent.

8. The iron-based alloy of claim 1, wherein the boron content is from about 0.03 to about 0.15 weight percent.

9. The iron-based alloy of claim 1, wherein the nickel content is less than about 2 weight percent.

10. The iron-based alloy of claim 1, wherein the iron-based alloy is in a hardened and tempered condition, and the iron-based alloy is strengthened by sigma phase strengthening, Laves phase strengthening, and carbide strengthening.

11. The iron-based alloy of claim 1, wherein the iron-based alloy comprises sigma phase in an amount of from about 3 to about 9 volume percent.

12. The iron-based alloy of claim 1, wherein the iron-based alloy has a compressive yield strength of at least 175 ksi at 1000° F.

13. The iron-based alloy of claim 1, wherein the iron-based alloy is in a hardened and tempered condition and has a bulk hardness of at least 50 HRc.

14. The iron-based alloy of claim 1, wherein the iron-based alloy is in a hardened and tempered condition and exhibits a Vickers hot hardness of from about 500 to about 700 HV10 at a temperature of from about 600° F. to about 800° F.

15. A part for an internal combustion engine comprising the iron-based alloy of claim 1.

16. A valve seat insert for use in an internal combustion engine, the valve seat insert being made of an iron-based alloy comprising, in weight percent:
    chromium from about 10 to about 25 percent;
    molybdenum from about 5 to about 20 percent;
    cobalt from about 17 to about 23 percent;
    iron from about 35 to about 55 percent; and
    wherein the chromium/molybdenum ratio of the iron-based alloy is from about 1.2 to about 2.5, the valve seat insert having an as-cast microstructure consisting essentially of uniformly distributed intradendritic and interdendritic regions with martensite in the intradendritic regions and carbides and sigma phase in the interdendritic regions of the microstructure.

17. The valve seat insert of claim 16, wherein the sigma phase is present in an amount of about 3 to about 9 volume percent and a ratio of the interdendritic/intradendritic regions is about 40:60 to about 60:40.

18. The valve seat insert of claim 16, having (a) a hot hardness HV10 of about 500 to about 700 at 600 to 800° F., (b) a hot hardness HV10 of about 150 to about 220 at 1600° F., (c) an ultimate tensile strength of about 80 to about 90 ksi at 75° F. and about 75 to about 85 ksi at 1200° F., (d) a compressive yield strength of 185 to about 250 ksi from 75 to 1000° F., and/or (d) a hardness HRC of about 50 to about 70 from 75 to 1350° F.

19. A method of manufacturing the valve seat insert according to claim 16, the method comprising casting the iron-based alloy and machining a piece of the iron-based alloy into the valve seat insert, hardening and tempering the valve seat insert such that martensite is formed in the intradendritic regions and sigma phase and carbides precipitate in the interdendritic regions of the microstructure.

20. A method of manufacturing a valve seat insert, the method comprising:
    forming a valve seat insert by melting and casting an iron-based alloy comprising, in weight percent:
        carbon from about 1 to 2.93 percent;
        manganese up to about 1 percent;
        silicon up to about 1 percent;
        nickel up to 12.03 percent;
        chromium from about 10 to about 25 percent;
        molybdenum from about 5 to about 20 percent;
        tungsten up to about 4 percent;
        cobalt from about 17 to about 23 percent;
        vanadium up to about 1.5 percent;
        boron up to about 0.2 percent;
        sulfur up to about 0.03 percent;
        nitrogen from about 0.1 to about 0.4 percent;
        phosphorus up to about 0.06 percent;
        niobium up to about 4 percent;
        iron from about 35 to about 55 percent; and
        incidental impurities,
        wherein the chromium/molybdenum ratio of the iron-based alloy is from about 1.2 to about 2.5, total chromium plus molybdenum is about 20 to about 35 percent and wherein the alloy has an as-cast microstructure consisting essentially of intradendritic regions and intradendritic regions with a ratio of the interdendritic/intradendritic regions of about 40:60 to about 60:40;
    hardening and tempering the casting such that tempered martensite is formed in the intradendritic regions and sigma phase and carbides precipitate in the interdendritic regions of the microstructure.

* * * * *